US012020374B2

(12) United States Patent
Ni et al.

(10) Patent No.: US 12,020,374 B2
(45) Date of Patent: Jun. 25, 2024

(54) BODY SHAPE AND POSE ESTIMATION VIA VOLUMETRIC REGRESSOR FOR RAW THREE DIMENSIONAL SCAN MODELS

(71) Applicant: Samsung Electronics Co., Ltd., Suwon-si (KR)

(72) Inventors: Saifeng Ni, Milpitas, CA (US); Zhipeng Fan, Brooklyn, NY (US)

(73) Assignee: Samsung Electronics Co., Ltd., Suwon-si (KR)

(*) Notice: Subject to any disclaimer, the term of this patent is extended or adjusted under 35 U.S.C. 154(b) by 100 days.

(21) Appl. No.: 17/486,485

(22) Filed: Sep. 27, 2021

(65) Prior Publication Data

US 2022/0101603 A1    Mar. 31, 2022

Related U.S. Application Data

(60) Provisional application No. 63/084,830, filed on Sep. 29, 2020.

(51) Int. Cl.
*G06T 17/20* (2006.01)
*G06N 3/04* (2023.01)
*G06T 7/73* (2017.01)
*G06T 13/40* (2011.01)
*G06T 17/10* (2006.01)

(52) U.S. Cl.
CPC ............ *G06T 17/20* (2013.01); *G06N 3/04* (2013.01); *G06T 7/73* (2017.01); *G06T 13/40* (2013.01); *G06T 17/10* (2013.01); *G06T 2207/10028* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 8,610,710 B2 | 12/2013 | Lim et al. | |
| 9,619,704 B2* | 4/2017 | Hasler | G06T 7/292 |
| 10,339,706 B2 | 7/2019 | Black et al. | |
| 10,679,046 B1* | 6/2020 | Black | G06V 40/23 |
| 10,748,325 B2 | 8/2020 | Corazza et al. | |
| 10,929,654 B2 | 2/2021 | Iqbal et al. | |
| 10,970,849 B2 | 4/2021 | Öztireli et al. | |

(Continued)

OTHER PUBLICATIONS

Rayat et al., "Exploiting Temporal Information for 3D Human Pose Estimation" (Year: 2017).*

(Continued)

*Primary Examiner* — Hilina K Demeter

(57) ABSTRACT

An electronic device for object rigging includes a processor. The processor is configured to obtain a three-dimensional (3D) scan of an object. The processor is also configured to identify 3D coordinates associated with joints of the 3D scan. The processor is further configured to identify parameters associated with fitting a 3D parametric body model to the 3D scan based on the 3D coordinates of the joints. Additionally, the processor is configured to modify the parameters to reduce 3D joint errors between the 3D coordinates associated with the joints on the 3D scan and the 3D parametric body model. The processor is also configured to generate a rigged 3D scan based on the modified parameters, for performing an animated motion.

20 Claims, 16 Drawing Sheets

(56) References Cited

U.S. PATENT DOCUMENTS

| | | | |
|---|---|---|---|
| 2009/0232353 A1* | 9/2009 | Sundaresan | G06T 7/251 |
| | | | 348/42 |
| 2010/0111370 A1* | 5/2010 | Black | G06F 18/2321 |
| | | | 705/26.1 |
| 2015/0145859 A1* | 5/2015 | Corazza | G06T 13/40 |
| | | | 345/419 |
| 2018/0315230 A1* | 11/2018 | Black | G06T 17/00 |
| 2019/0164341 A1 | 5/2019 | Venkataraman | |
| 2019/0371080 A1* | 12/2019 | Sminchisescu | G06T 17/20 |
| 2019/0392626 A1 | 12/2019 | Black et al. | |
| 2020/0193591 A1 | 6/2020 | Kamiyama et al. | |
| 2020/0302621 A1 | 9/2020 | Kong et al. | |
| 2021/0150806 A1 | 5/2021 | Guler et al. | |
| 2021/0192783 A1* | 6/2021 | Huelsdunk | G06T 7/75 |

OTHER PUBLICATIONS

Trumble et al., "Deep Autoencoder for Combined Human Pose Estimation and Body Model Upscaling" (Year: 2018).*

Ghezelghieh et al., "Learning camera viewpoint using CNN to improve 3D body pose estimation" (Year: 2016).*

Noh et al., "SkelSeg: Segmentation and Rigging of Raw-Scanned 3D Volume with User-Specified Skeleton" (Year: 2019).*

Bartol et al. "A Review of Body Measurement Using 3D Scanning" (Year: 2021).*

International Search Report and Written Opinion dated Jan. 14, 2022 regarding International Application No. PCT/KR2021/013311, 6 pages.

* cited by examiner

3D SCAN MODEL          VOXELIZED MODEL

3D SCAN MODEL          VOXELIZED MODEL

BODY SHAPE AND POSE ESTIMATION VIA VOLUMETRIC REGRESSOR FOR RAW THREE DIMENSIONAL SCAN MODELS

CROSS-REFERENCE TO RELATED APPLICATION AND CLAIM OF PRIORITY

This, application claims priority under 35 U.S.C. § 119(e) to U.S. Provisional Patent Application No. 63/084,830 filed on Sep. 29, 2020. The above-identified provisional patent application is hereby incorporated by reference in its entirety.

TECHNICAL FIELD

This disclosure relates generally to media content. More specifically, this disclosure relates to body shape and pose estimation via volumetric regressor for raw three dimensional scan models.

BACKGROUND

Recent advances in multimedia have pushed the media contents to evolve from two dimensional (2D) to three dimensional (3D). For example, 3D content is often found in movies, games and can be completely computer generated or generated from a set images of an object or a combination thereof. Animating a static object includes rigging the object with both a surface representation, such as skin, and a hierarchical set of interconnected parts such as a skeleton. Rigging a static object to be animatable is complex and time-consuming which impedes the widespread ability of creating a fully animated objects.

SUMMARY

This disclosure provides body shape and pose estimation via volumetric regressor for raw three dimensional scan models.

In one embodiment, an electronic device for object rigging is provided. The electronic device includes a processor. The processor is configured to obtain a three-dimensional (3D) scan of an object. The processor is also configured to identify 3D coordinates associated with joints of the 3D scan. The processor is further configured to identify parameters associated with fitting a 3D parametric body model to the 3D scan based on the 3D coordinates of the joints. Additionally, the processor is configured to modify the parameters to reduce 3D joint errors between the 3D coordinates associated with the joints on the 3D scan and the 3D parametric body model. The processor is also configured to generate a rigged 3D scan based on the modified parameters, for performing an animated motion.

In another embodiment, a method for object rigging is provided. The method includes obtaining a 3D scan of an object. The method also includes identifying 3D coordinates associated with joints of the 3D scan. The method further includes identifying parameters associated with fitting a 3D parametric body model to the 3D scan based on the 3D coordinates of the joints. Additionally, the method includes modifying the parameters to reduce 3D joint errors between the 3D coordinates associated with the joints on the 3D scan and the 3D parametric body model. The method also includes generating a rigged 3D scan based on the modified parameters, for performing an animated motion.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

As two dimensional (2D) content evolves to three dimensional (3D) content, animated 3D objects are becoming increasingly popular. Many different types of devices are able to provide 3D content. For example, 3D content can be rendered on a display. For another example, 3D content can be provided via an immersive experience associated with augmented reality (AR) or virtual reality (VR). It is noted that VR is a rendered version of a visual object or a visual scene, while AR is an interactive experience of a real-world environment where objects that reside in the real-world environment are augmented with virtual objects, virtual information, or both. One example device that is capable of providing AR and VR content is a head-mounted display (HMD). An HMD is a device that enables a user to view the VR scene and adjust the displayed content based on movements of the head of the user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

Figure 6B:
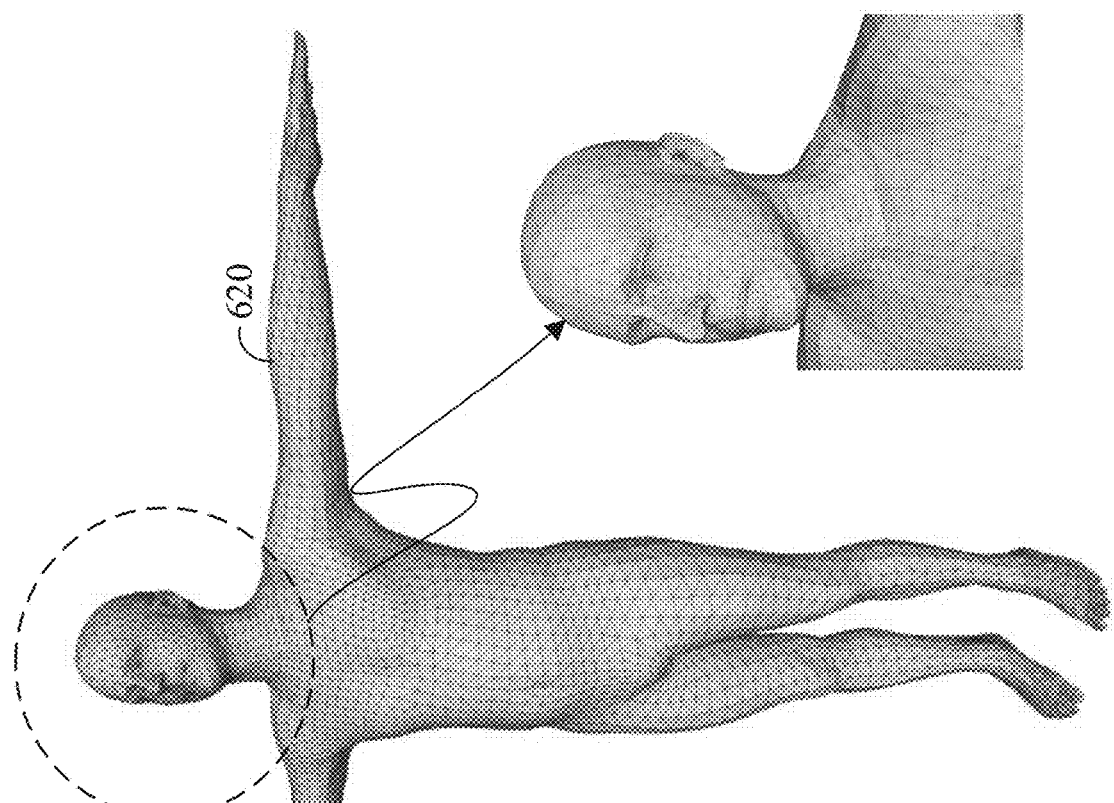
FIGS. 6A and 6B illustrate a 3D parametric body model in accordance with an embodiment of this disclosure.

To digitize an object such as a human, a 3D scan of the object is acquired. A 3D scan of an object is a realistic 3D model of the given object. The 3D scan is a 360 degree 3D image of an object, such as a human or an animal. For example, the 3D scan of an object can be created by capturing multiple images of the object at different angles (or orientations) and then stitching the individual images together. The images can be from a camera such as color camera (a such as a Red Green Blue (RGB) camera) or a depth camera, or a combination of both (such as an RGB-D camera). For another example, specialized hardware can be used to generate the 3D scan of the object. Regardless of how the 3D scan is acquired, the 3D scan of the object can be represented as a 3D mesh. The 3D mesh can be made up of millions of vertices. FIG. 6B, described below, illustrates an example 3D mesh.

The 3D scan of an object can be used in 3D graphics (such as gaming, an avatar of the user, motion pictures, and the like), 3D printing (making a figurine of the object), and the like. For example, a 3D scan can represent an avatar of a person.

Embodiments of the present disclosure take into consideration that a 3D scan has no ability to move on its own, since the image(s) that are used to generate the 3D scan are static (non-moving). Therefore, embodiments of the present disclosure provide systems and methods for automatically rigging a static 3D scan with motion. That is, rigging a 3D scan is the ability to provide motion (animation) to a static 3D scan. After a 3D scan is rigged, portions of the scan are able to move with respect to other portions of the 3D scan at predefined locations, such as a joint. For example, if the scan is of a human, a joint of the 3D scan can correspond to an elbow, a shoulder, a wrist, fingers, a hip, a knee, ankle, toes, spine, and the like. The joints of the 3D scan are used to provide movement that mimics a movement which can be performed by a human. That is, rigging a 3D scan, such as that of a human, can animate a static scan which can be used in various applications such as AR, VR, and the like.

Embodiments of the present disclosure describe a rigging pipeline for automatically rigging a static 3D scan for animation. For example, a scanned 3D can be associated with a pre-rigged parametric model for annotating the static 3D scan. The automatic rigging a 3D scan can be performed on a server or on an electronic device that generated the 3D mesh or captured the images that are compiled to generate the 3D scan. The rigging pipeline rigs a static 3D scan of an object (such as a human) for motion. The human can be in any pose. The human can be wearing various types clothing. For example, if the scanned 3D mesh is of a human, then the pre-rigged parametric model is of a generic human. For example, if the scanned 3D mesh is of an animal, such as a dog, then the pre-rigged parametric model is of a generic dog. Embodiments of the present disclosure describe building correspondence between the scanned mesh and the pre-rigged parametric model and then associating the rigging information from model to the 3D scan.

According to embodiments present disclosure, rigging includes two parts-fitting and skinning. Fitting includes applying a skeleton type structure of a rigged parametric model to the 3D scan. The skeleton is a joint tree that is used to define the bone structure of the object (such as a human) While the tree structure remains fixed for different scan models, the joint locations can vary. As such, the body motions are defined on the skeleton tree. Each joint has three degrees of freedom (DoF) to define its rotation. The root joint has three or more DoFs to define the translation. Skinning defines how the surface vertex (skins) are affected by the motion of the joints. For a given motion of the skeleton, the surface of the scan is deformed to perform the motion with minimal artifacts. When motion is applied to a 3D scan that previously had a skeleton and skinning is applied to it, the 3D scan is animated to follow the motions.

To animate a static 3D scan, embodiments of the present disclosure use a rigged parametric body model (also referred to as a parametric body model). The parametric body model is used to relate information to the 3D scan model. To vividly drive the digitized 3D scans with animation motion via rigging, a set of hierarchically connected bones (skeleton) and the associated weights for each vertex on the surface (skinning) are associated with the 3D scan. The rigging includes a skeleton based hierarchy and appropriate skinning weights that are defined to deform the surface of the 3D scan according to an input motion. The skeleton structure can be based on a parametric model that includes joints at predesignated locations. That is, the skeleton structure is similar to the skeleton structure of a human body, since it is designed to move at certain locations and in certain angles, such as joints, while other portions remain rigid. When a portion of the 3D scan moves at a joint, the external surface, the skin, of the 3D scan is modified based on the movement.

Figure 1:
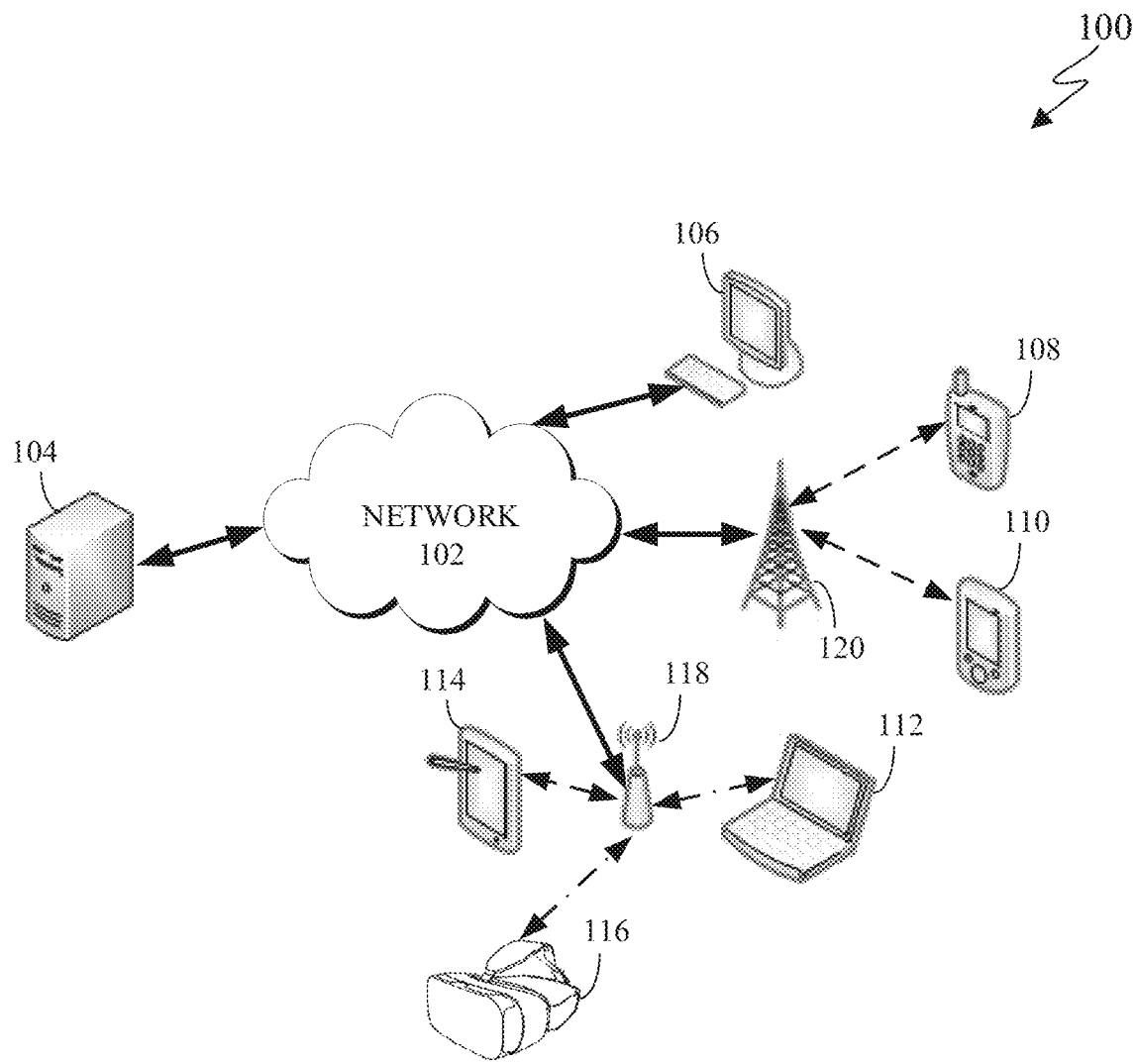
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate internet protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a head mounted display (HMD), or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can rig a 3D model that is animatable to one or more display devices, such as a client device 106-116.

Each client device 106-116 represents any suitable computing or processing device that interacts with at least one server (such as the server 104) or other computing device(s) over the network 102. In this example, the client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more animated scans.

In this example, some client devices 108-116 communicate indirectly with the network 102. For example, the mobile device 108 and PDA 110 communicate via one or more base stations 120, such as cellular base stations or eNodeBs (eNBs). Also, the laptop computer 112, the tablet computer 114, and the HMD 116 communicate via one or more wireless access points 118, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to animate a received 3D scan and transmit the animated scan to another client device such as any client device 106-116.

In certain embodiments, any of the client devices 106-116 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D scan, transmit a 3D scan, animate a 3D scan, receive an animatable 3D scan, render the animated 3D scan, or a combination thereof. For example, the mobile device 108 can capture images of the model and transfer the images to the server 104 for rigging. For another example, the mobile device 108 can receive multiple from other client devices and transfer the images to the server 104 for rigging. For yet another example, the mobile device 108 (or any other client device) can perform the rigging of the model.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
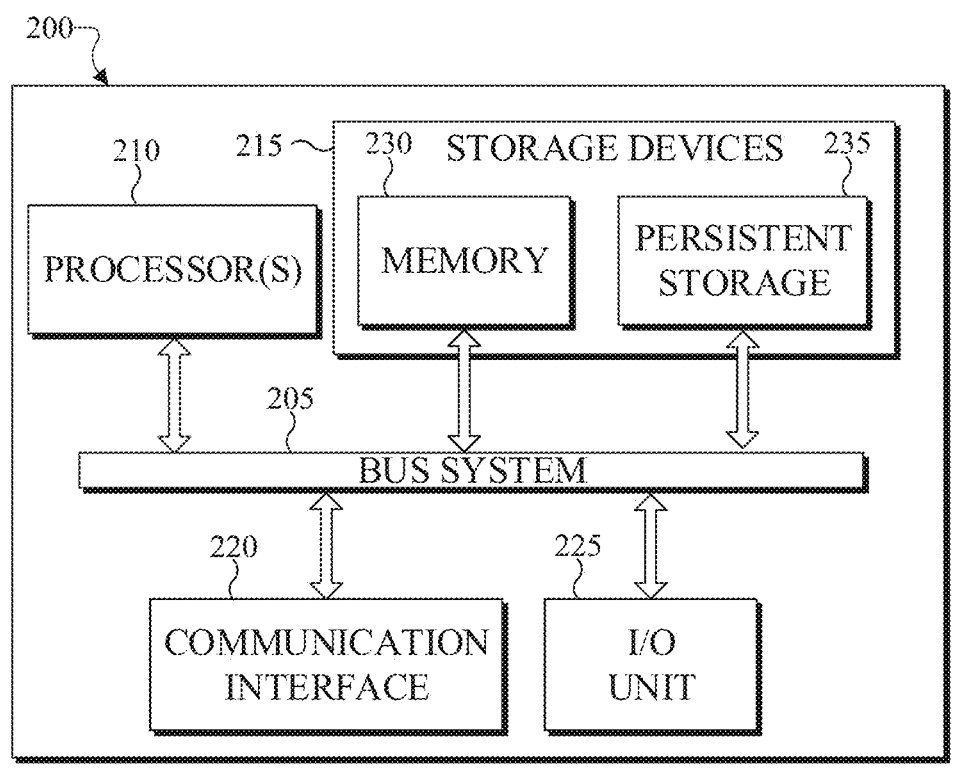
FIGS. 2 and 3 illustrate example electronic devices in accordance with an embodiment of this disclosure.
Figure 3:
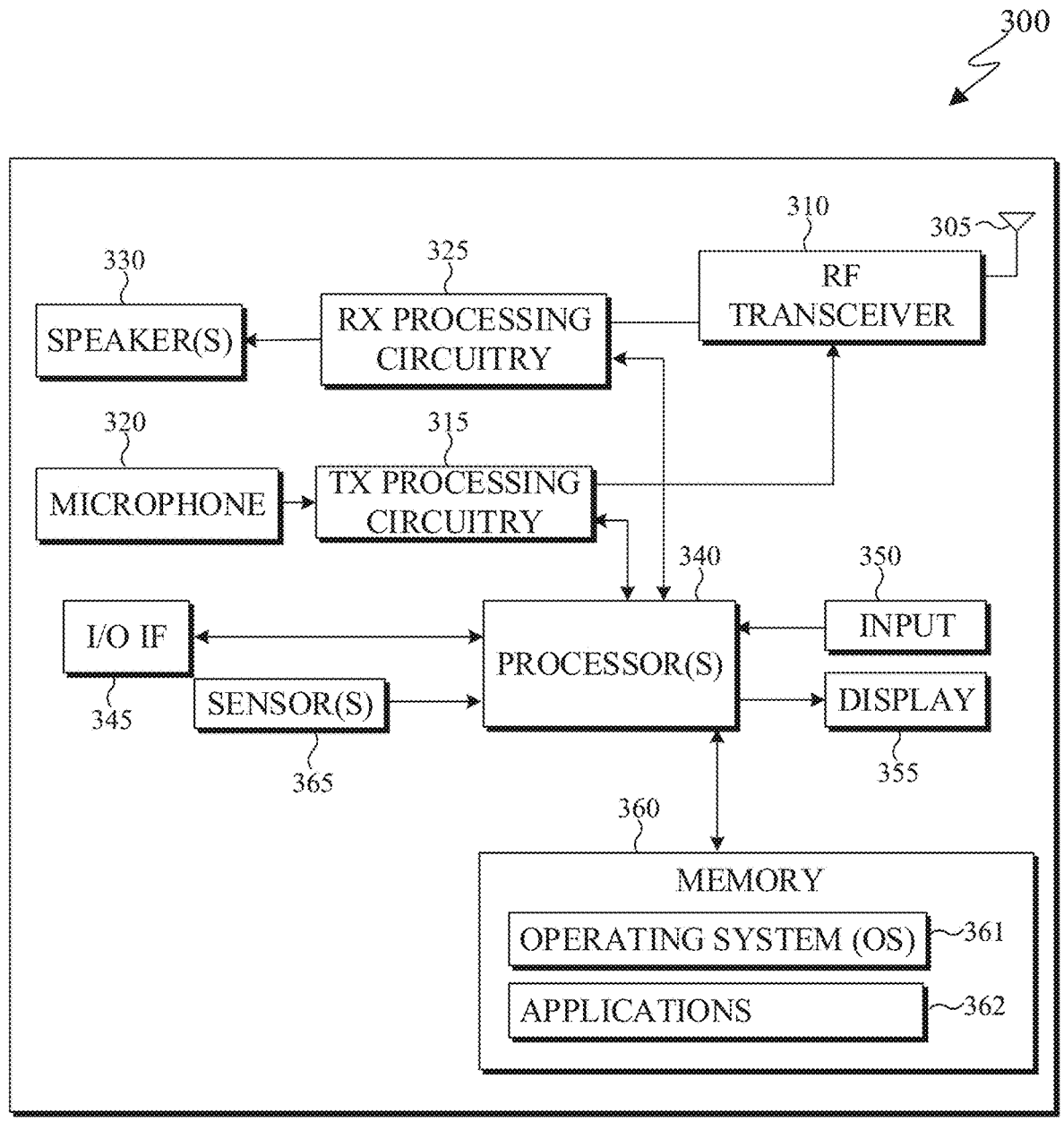

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communication interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can animate a 3D scan stored within the storage devices 215.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for rigging a received 3D scan and instructions for animating the rigged 3D scan The persistent storage 235 can contain one or more components or devices supporting longer-term storage of data, such as a read only memory, hard drive, Flash memory, or optical disc.

The communication interface 220 supports communications with other systems or devices. For example, the communication interface 220 could include a network interface card or a wireless transceiver facilitating communications over the network 102 of FIG. 1. The communication interface 220 can support communications through any suitable physical or wireless communication link(s). For example, the communication interface 220 can transmit the rigged 3D scan to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is usable with data transfer, rigging and animating a 3D model, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361 and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include a VR or AR application, a camera application (for still images and videos), a stitching application (for stitching multiple images together to generate a 3D model), a rigging application, a video phone call application, an email client, a social media client, a SMS messaging client, a virtual assistant, and the like.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user to interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as an animated 3D object.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, animated and static 3D objects, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor/camera), a depth sensor, a D-RGB sensor (depth Red Green Blue sensor/camera), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
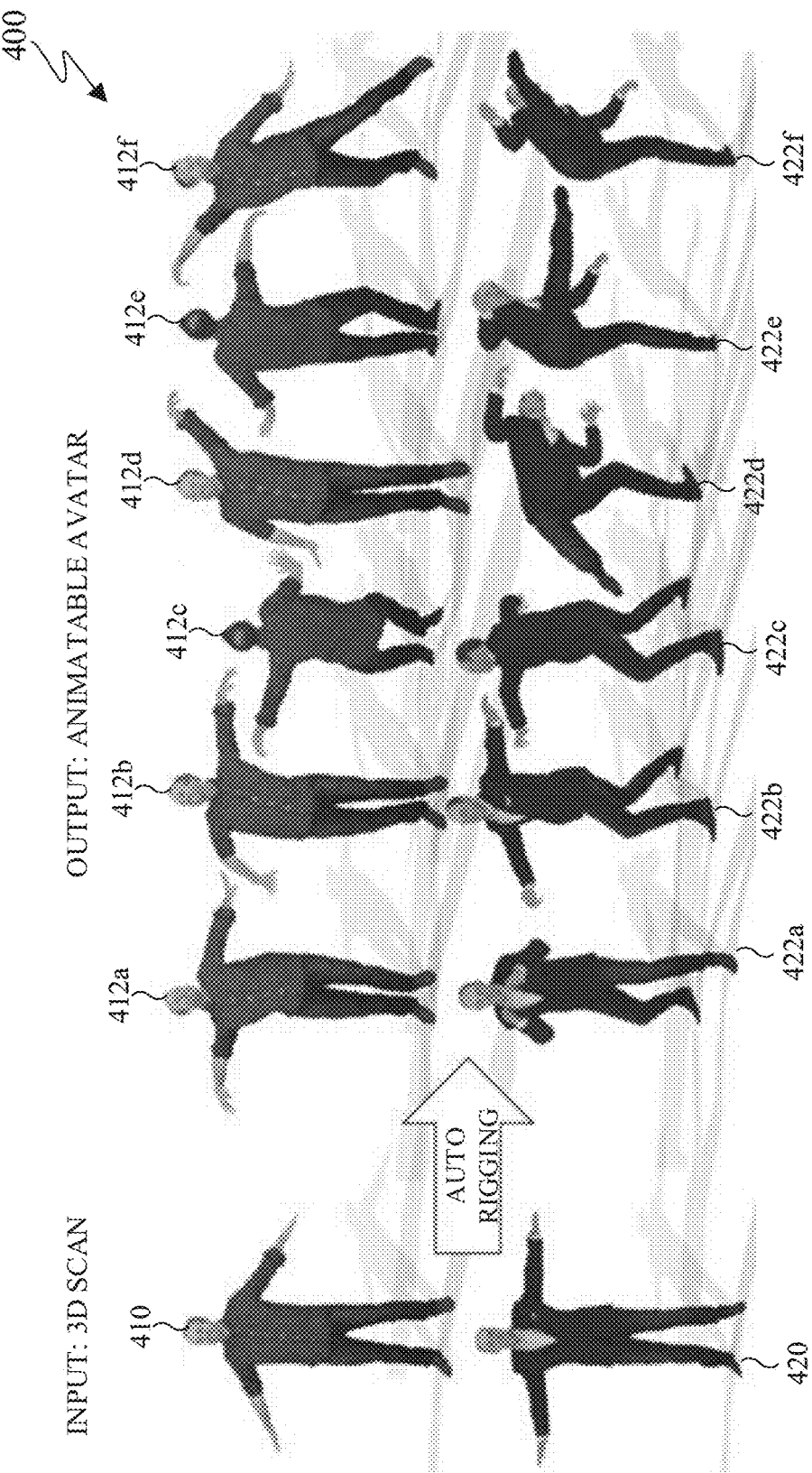
FIG. 4 illustrates an example diagram of converting a 3D scan to an animated model in accordance with an embodiment of this disclosure.

FIG. 4 illustrates an example diagram 400 of converting a 3D scan to an animated model in accordance with an embodiment of this disclosure. The embodiment of FIG. 4 is for illustration only and other embodiments can be used without departing from the scope of the present disclosure.

The diagram 400 includes two separate inputs, a first input 410 and a second input 420. The first and second inputs 410 and 420 are a 360 degree view of an object. The objects are of different humans. The first and second inputs 410 and 420 can be a 3D mesh. The first and second inputs 410 and 420 are static such that the inputs have no motion associated therewith.

The auto rigging as disclosed by the embodiments of the present disclosure animates the static 3D scan. For example, for a given input, such as the first input 410, the output 412a, 412b, 412c, 412d, 412e, and 412f (collectively 412) would be the moveable avatar, based on a set of animation instructions. Similarly, for the second input 420, the output would be the moveable avatar 422a, 422b, 422c, 422d, 422e, and 422f (collectively 422), based on a set of animation instructions. The animation that is added to the first input 410 is dancing while the animation that is added to the second input 420 is fighting. As shown, the moveable avatars 412 and 422 move at corresponding joints similar to humans while areas that do not have joints remain straight (non-bending).

Although FIG. 4 illustrate the diagram 400 various changes can be made to FIG. 4. For example, different animation can be applied to the inputs. FIG. 4 does not limit this disclosure to any particular system or apparatus.

Figure 5A:
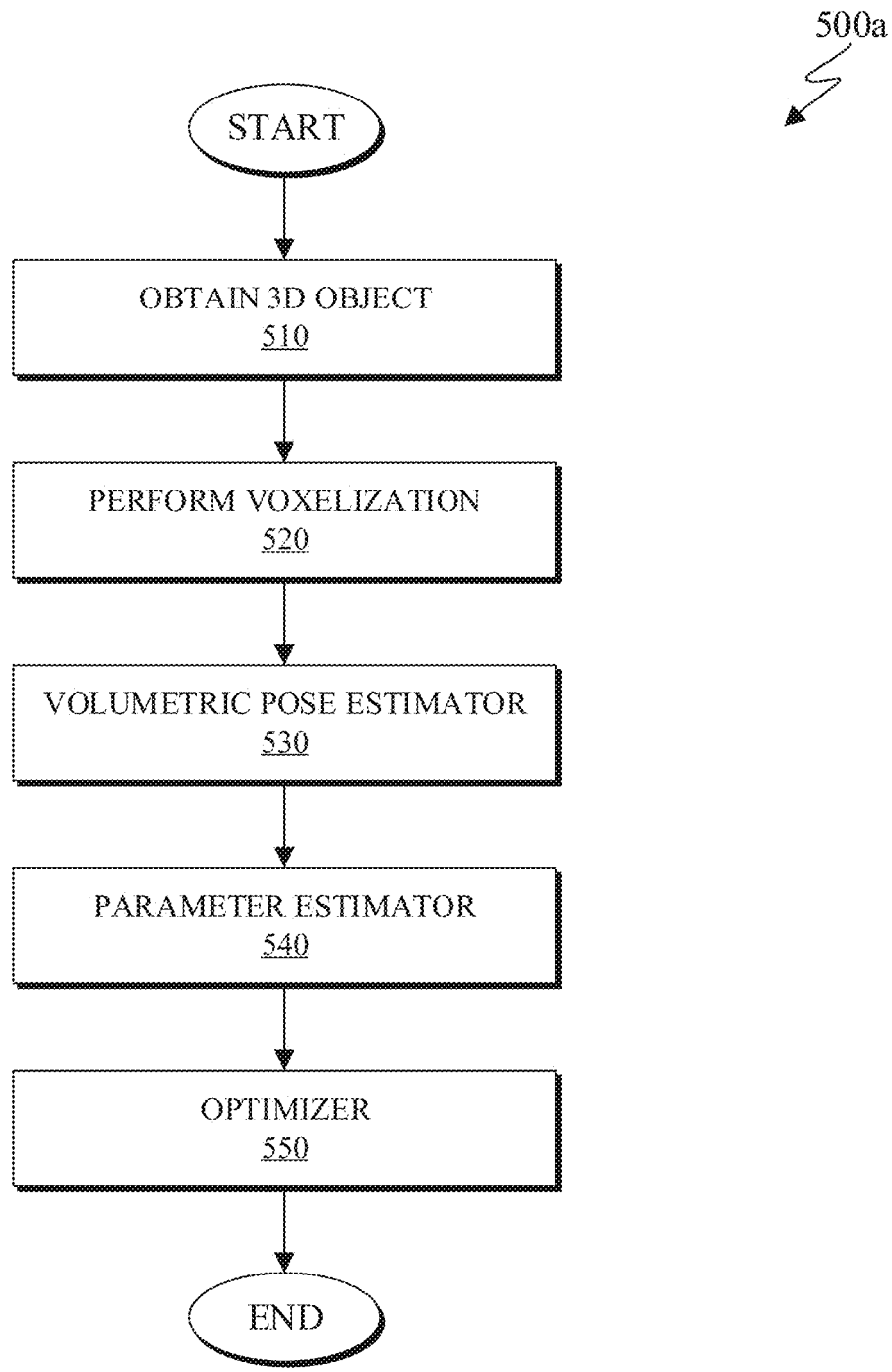
FIGS. 5A and 5B illustrate example methods for rigging a static object into an animated model in accordance with an embodiment of this disclosure.
Figure 5B:
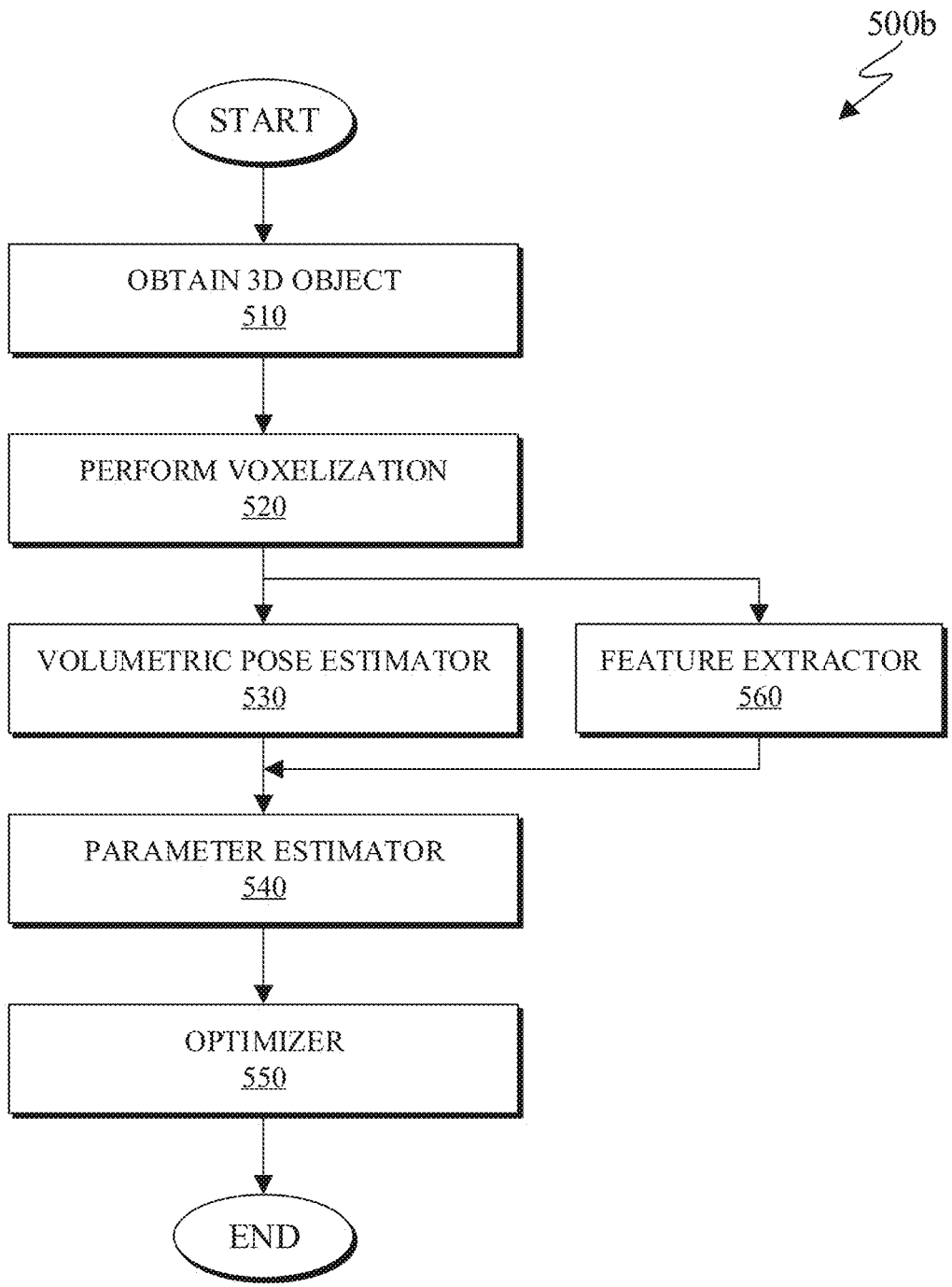

FIGS. 5A and 5B illustrate example methods 500a and 500b for rigging a static object into an animated model in accordance with an embodiment of this disclosure. The embodiments of FIGS. 5A and 5B are for illustration only and other embodiments can be used without departing from the scope of the present disclosure.

The method 500 can be performed by the server 104, one of the client devices 106-116 of FIG. 1, the server 200 of FIG. 2, the electronic device 300 of FIG. 3, or another suitable device. In certain embodiments, the method 500 can be performed by a "cloud" of computers interconnected by one or more networks, where each is a computing system utilizing clustered computers and components to act as a single pool of seamless resources when accessed through the network 102 of FIG. 1. In some embodiments, a portion of the components that are used to process the method 500 can be included in different devices, such as multiple servers 104 or 200, multiple client devices 106-116, or other combination of different devices. For ease of explanation the method 500 is described as being performed by the server 104 of FIG. 1 with the internal components of the server 200 of FIG. 2. It is noted that any of the client devices 106-116 of FIG. 1 with the internal components of the electronic device 300 of FIG. 3 can be used to perform the method 500 in addition to or in alternative of the server 104.

The method 500a of FIG. 5A is similar to the method 500b of FIG. 5B. Both methods describe 3D volumetric based approach for automatically registering a rigged parametric body model to a 3D mesh. It is noted that the method 500b of FIG. 5B includes an additional step which is omitted from the method 500a of FIG. 5A. As such, the description of FIG. 5B will focus on the step 560.

In certain embodiments, steps 530, 540, and 550 of FIG. 5A use different neural networks. Similarly, steps 530, 540, 550 and 560 of FIG. 5B use different neural networks.

In step 510, the processor 210 obtains a 3D object. The 3D object can be a scan of a 3D object, such as a human. The 3D object can be a 3D mesh that is stored in the memory 360 of the electronic device 300 of FIG. 3 or the memory 230 of FIG. 2.

Figure 7A:
FIGS. 7A and 7B illustrate example images of voxelizing a 3D scan in accordance with an embodiment of this disclosure.
Figure 7A:
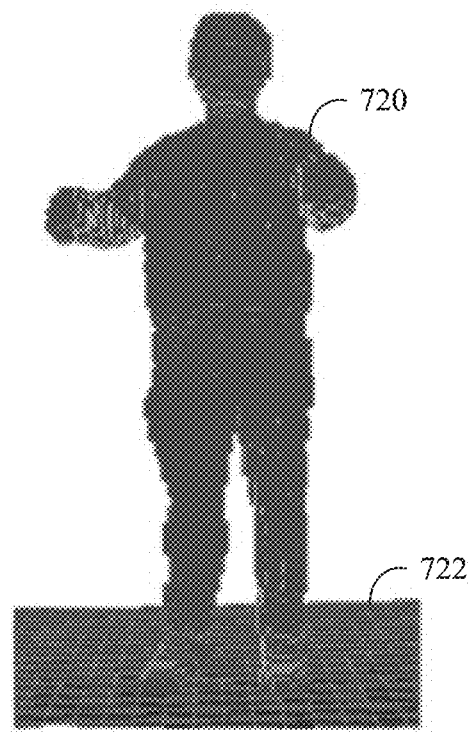
Figure 7B:
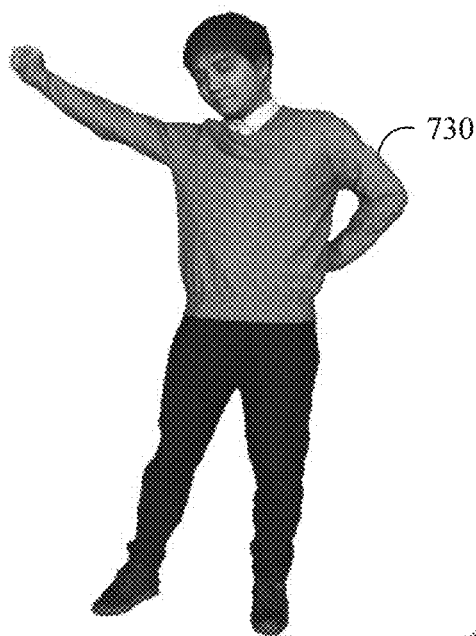
Figure 7B:
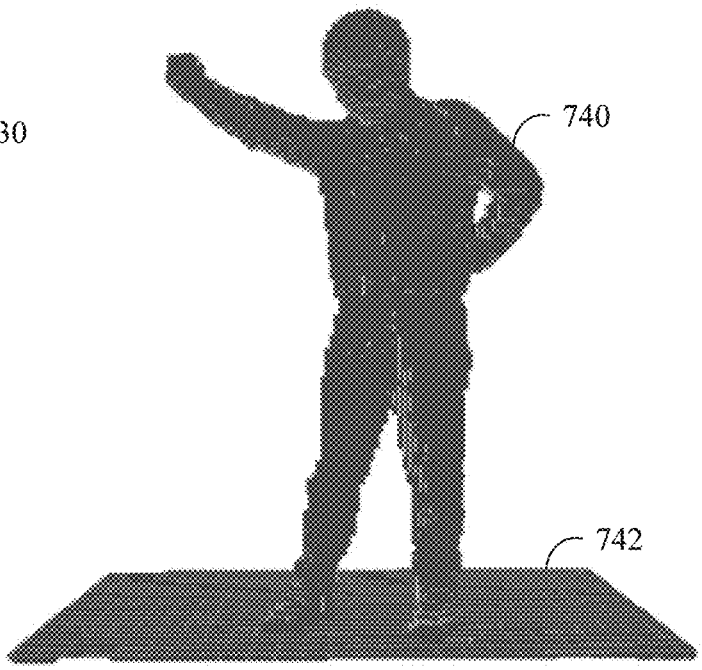

In step 520, the processor 210 performs a voxelization on the 3D mesh. For example, the processor converts the 3D mesh to a volumetric representation. The processor determines for each portion of the 3D mesh (such as each pixel, set of pixels, voxels, or the like), whether that portion corresponds to the 3D mesh or another object, such as the floor, background, and the like. Since, scanned 3D meshes come with various geometry, it can create the difficulty to directly process it for rigging. Accordingly, the processor 210 in step 520 unifies different 3D scan inputs to a voxel grid of fixed size. For example, the processor 210 can reduce the size of the 3D scan to a predefined resolution. For example, if a neural network of one of the previous steps is trained using an input of a certain size, then the processor 210 reduces the size of the voxelized representation of the 3D mesh. In certain embodiments, the processor 210 uses an open source CUDA voxelizer with a target resolution. For example, the target resolution could be of 128×128×128. The voxelization process can reduce errors bought by small wrinkles on clothing of the 3D mesh. Examples of the volumetric representation are illustrated in FIGS. 7A and 7B.

Figure 8A:
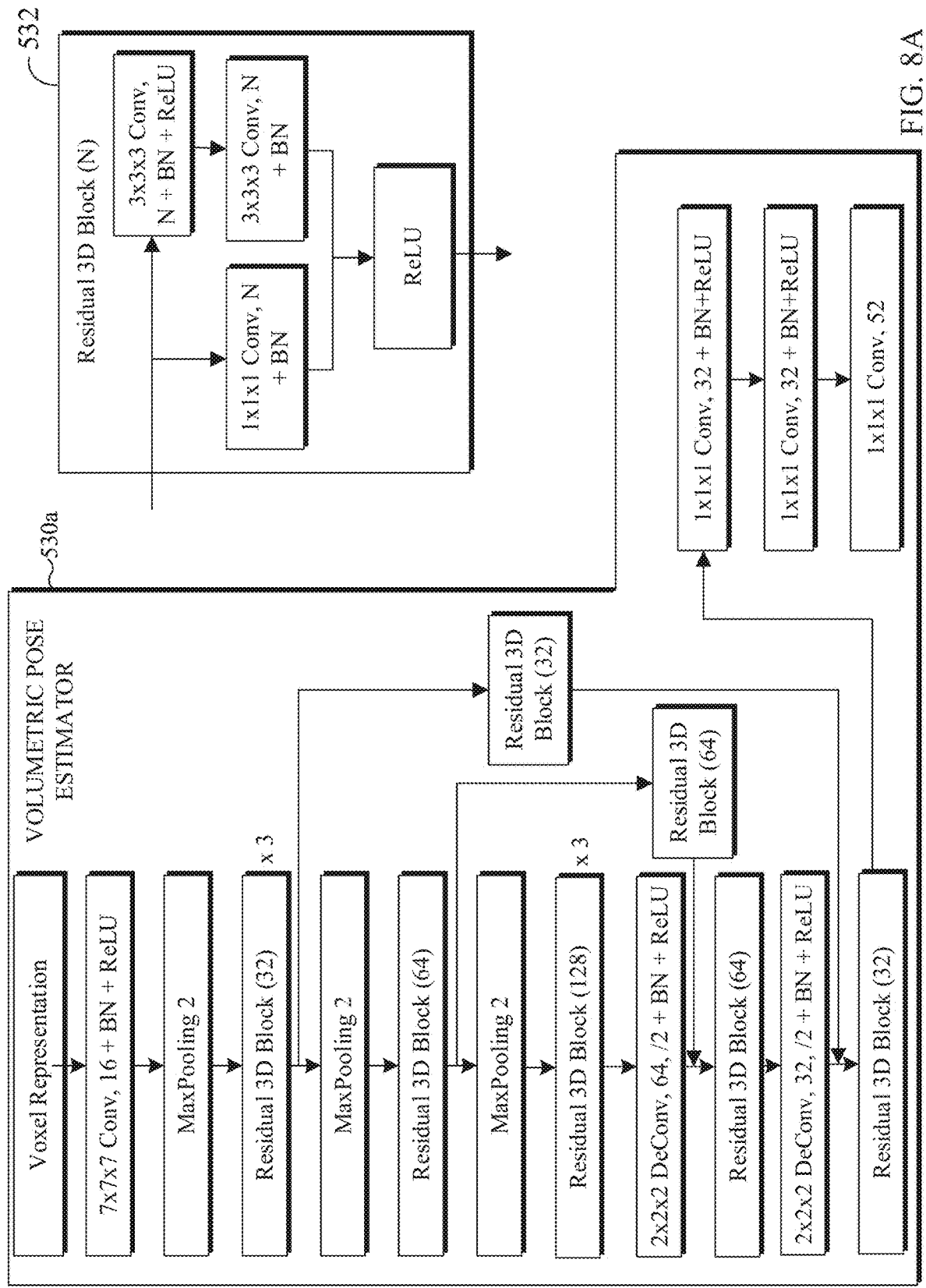
FIG. 8A illustrates an example architecture of a neural network for estimating a volumetric pose of a 3D scan in accordance with an embodiment of this disclosure.

In step 530, the processor 210 estimates the joint coordinates. In certain embodiments, the joint coordinates can be estimated using a volumetric based pose estimator such as a 3D Convolutional Neural Net (CNN). The CNN can include 3D convolution, max pooling and deconvolution. In certain embodiments, the processor 210 uses—a CNN similar to V2V-PoseNet to identify coarse joint locations on the voxelized representation of the 3D mesh. FIG. 8A illustrates an example CNN for identifying joint coordinates.

The output of the CNN is a map indicating the approximate locations of the joints in 3D space. The map can be a heatmap. For example, the joint position can be parameterized in the form of heatmap, indicating the predicted joint position as coordinates in 3D space.

In step 540, the processor 210 maps the predicted joint coordinates (of step 530) back to the mesh space. The processor 210 then identifies parameters of a rigged parametric body model (RPBM). The RPBM represents a rigged model that corresponds to the 3D mesh. For example, if the 3D mesh is a human, then the RPBM corresponds to a generic humanoid. For another example, if the 3D mesh is a dog, then the RPBM corresponds to a generic dog.

Figure 9A:
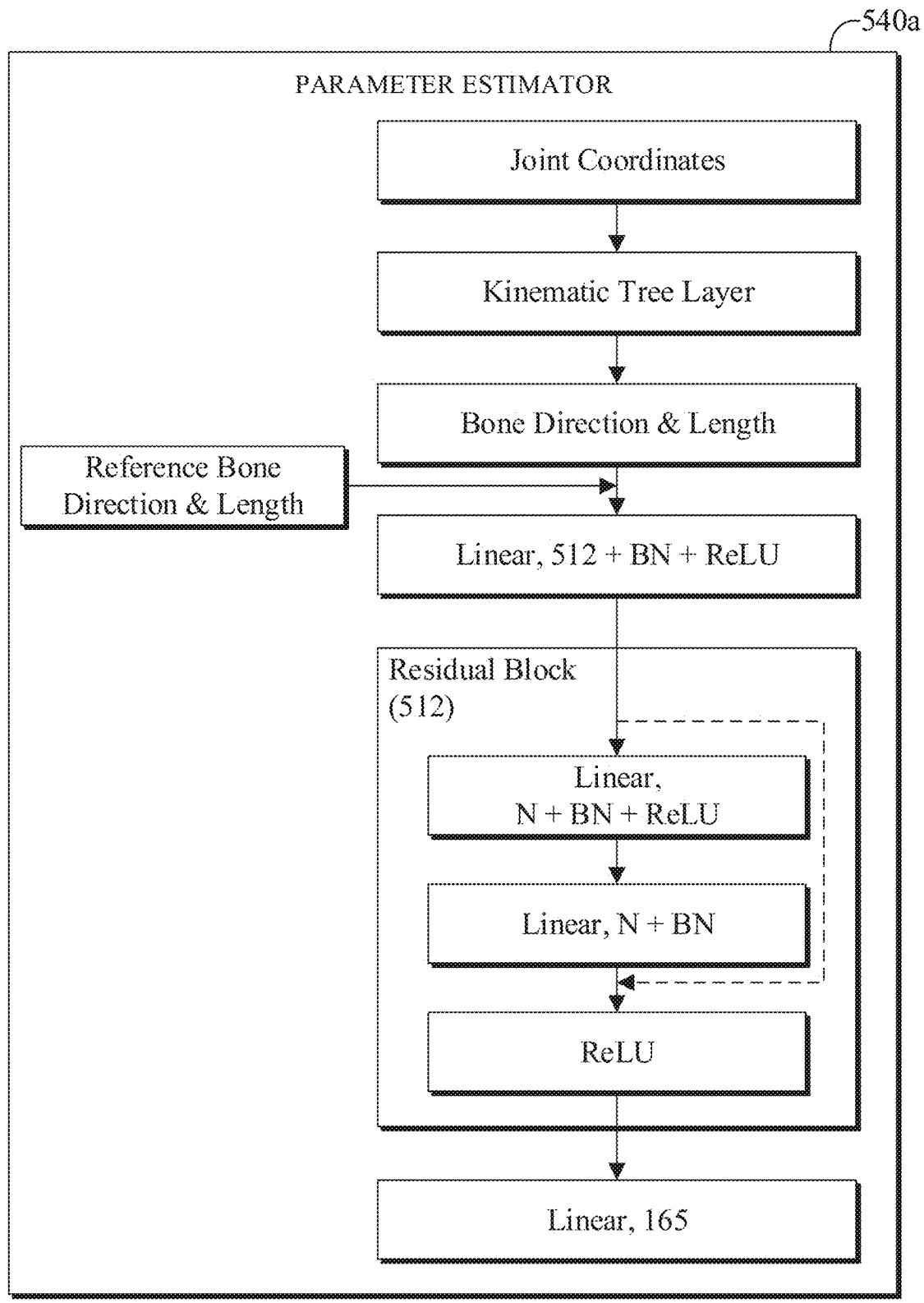
FIG. 9A illustrates an example architecture of a neural network for estimating parameters associated with the 3D scan in accordance with an embodiment of this disclosure.

In certain embodiments, to identify the parameters of the RPBM, the processor 210 uses a neural network. For example, the predicted joint coordinates are mapped back to the mesh space and then provided to an Inverse Kinematic Net (IK Net) to estimate the parameters of the RPBM. The IK Net includes a kinematic tree layer for identifying bone direction and length based on the estimated joints. FIG. 9A illustrates an example IK Net for identifying parameters. The parameters can include body pose and body shape.

In step 550, processor 210 optimizes the joint locations. For example, the estimated parametric body model parameters are then used as the initialization of the optimization based post processing. The post processing fine tunes the predicted parameters (of step 540) to minimize the modulated joint distance. FIG. 10 illustrates an example optimizer for modifying the parameters to reduce 3D joint errors between the 3D coordinates associated with the joints on the 3D scan and the rigged parametric body model.

Figure 11:
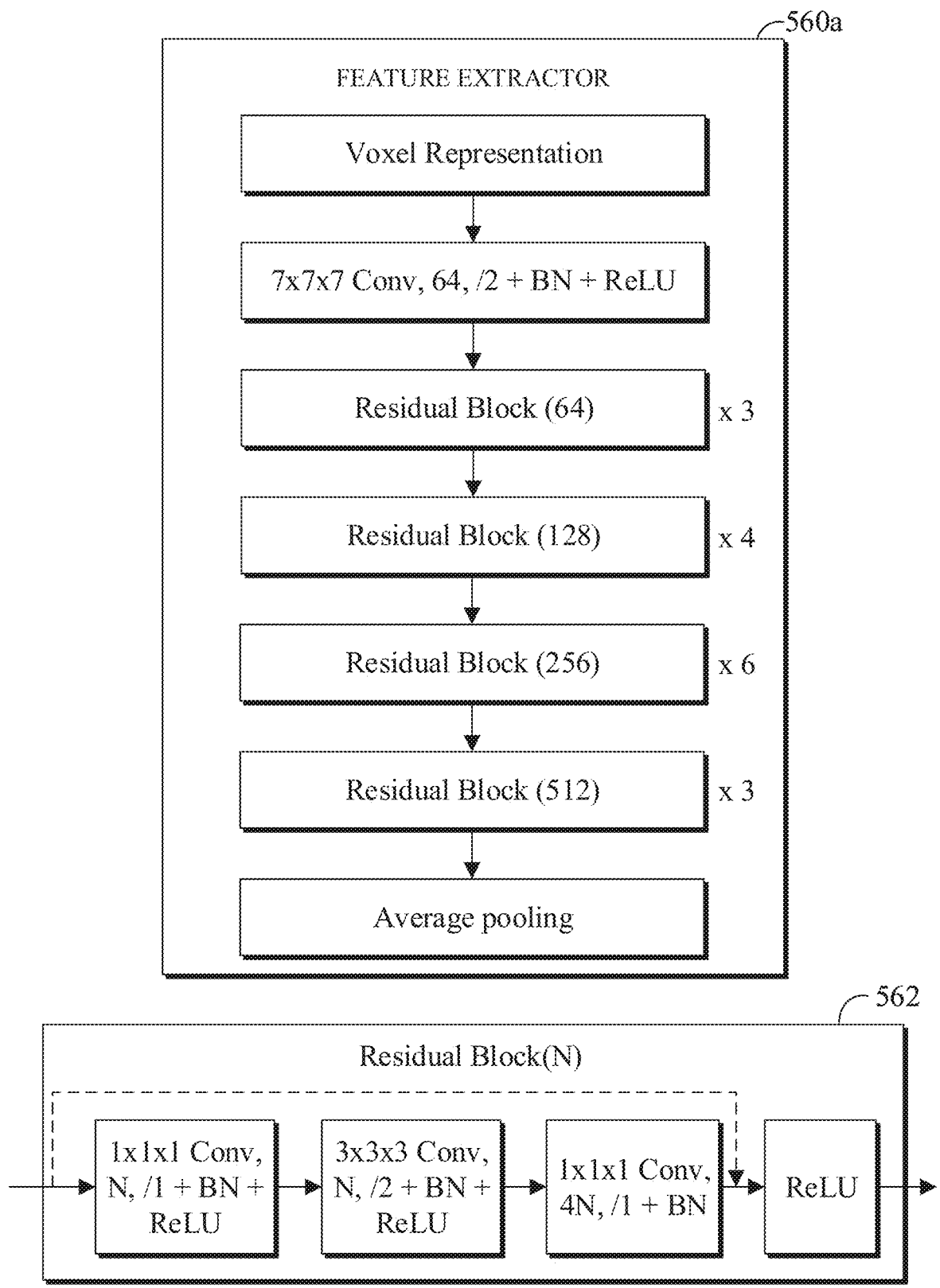
FIG. 11 illustrates an example architecture of a neural network for extracting features in accordance with an embodiment of this disclosure.

In step 560 of FIG. 5B, the processor 210 extracts features. The extracted features are used to improve identification of parameters of step 540. For example, instead of an IK Net (of step 540) that is entirely built upon the estimated joint coordinates, step 560 reuses the voxel grid (of step 520) as additional information for the IK Net (of step 540). By including the voxel grid (of step 520) as additional information, enables the IK Net to recover from unreliable (or unreasonable) joint coordinates and better predict the shape parameters. It is noted that the method 500b uses higher computation complexity than the method 500a due to the addition of step 560. In certain embodiments, the processor 210 uses a volumetric ResNet 50 is an example model that extracts additional features from the voxel grid for the IK Net (of step 540). FIG. 11 illustrates an example neural network of the volumetric ResNet 50.

Although FIGS. 5A and 5B illustrate the methods 500a and 500b, respectively, various changes can be made to FIGS. 5A and 5B. For example, while FIG. 5A is shown as a series of steps, various steps could overlap, occur in parallel, or occur any number of times. FIGS. 5A and 5B do not limit this disclosure to any particular system or apparatus.

Figure 6A:
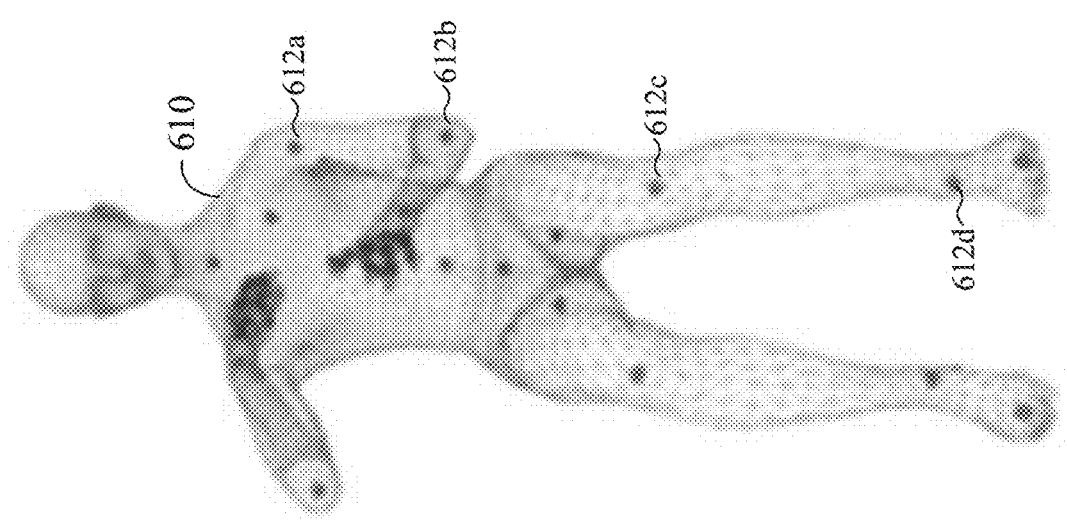

FIGS. 6A and 6B illustrate an example RPBM 610 and 620, respectively, in accordance with an embodiment of this disclosure. The embodiments of FIGS. 6A and 6B are for illustration only and other embodiments can be used without departing from the scope of the present disclosure.

As shown in FIG. 6A, the RPBM 610 is a 3D structure. The RPBM 610 is an entire view of a 3D parametric body model in a seated position. The RPBM 610 includes a hierarchical set of interconnected parts such as a skeleton and joints, such as joints 612a, 612b, 612c, 612d, and the like (collectively joints 612), which are illustrated as dots throughout the RPBM 610. The joints connect the skeleton which allows the RPBM 610 to move. That is, the skeleton is a joint tree that is used to define the bone structure of the parametric body model. The body motions are defined on the skeleton tree. For example, some or all of the joints rotate in three DoF. Joints can be located throughout the parametric body model 580 such as at the neck, shoulder (such as joint 612a), wrist, elbow (such as joint 612b), wrist, fingers, hip, knee (such as joint 612c), ankle (such as joint 612d), toes, and throughout its face and back. The joints enable the parametric body model 580 to bend at similar locations as a human as well as perform similar movements at each joint that mimics the movements of a human. The RPBM 610 is a mesh that is composed of a set of vertices connected into multiple triangular shapes. The vertices can deform causing the the triangles to stretch or contract as needed to modify the outline of the RPBM 620 when a joint moves. It is noted that other shapes in addition to or in alternative of triangles.

As shown in FIG. 6B, the RPBM 620 is a 3D structure. The RPBM 620 is an entire view of a 3D parametric body model in a standing position. The RPBM 620 can include joints at similar locations as the RPBM 610 of FIG. 6A, however the joints are not illustrated. Rather, the RPBM 620 illustrates the 3D mesh in greater detail as compared to FIG. 6A.

The RPBM 620 is a mesh that is composed of a set of vertices connected into multiple triangular shapes. The vertices can deform then the triangles can stretch or contract as needed to modify the outline of the RPBM 620 when a joint moves. It is noted that other shapes in addition to or in alternative of triangles. A 3D mesh includes edges and vertices. An edge represents the connectivity information of a mesh as they connect one vertex to another vertex. A face is a set of edges that when closed form a polygon. A face can represent connectivity information of a mesh as it is formed by connecting multiple vertices together. That is, triangular meshes are polygonal meshes in which the faces of the mesh are triangles, as illustrated in FIGS. 6A and 6B. For example, the face is one triangle, and the edges are the three lines that form the triangle by connecting three different vertices.

FIGS. 7A and 7B illustrate example images of voxelizing a 3D scan in accordance with an embodiment of this disclosure. The embodiments of FIGS. 7A and 7B are for illustration only and other embodiments can be used without departing from the scope of the present disclosure.

FIG. 7A illustrates a 3D scan 710 and a voxelized model 720 of the 3D scan 710. The 3D scan 710 can be a 3D mesh of an object in a particular pose as illustrated. The voxelized model 720 represents a voxelized version of the 3D scan 710. Similarly, FIG. 7B illustrates a 3D scan 730 and a voxelized model 740. The 3D scan 710 can be a 3D mesh of an object in a particular pose as illustrated. The voxelized model 740 represents a voxelized version of the 3D scan 730. Both of the 3D scans 710 and 730 are 3D scans of the entire object including the front (shown) and the sides and back of the object (not shown). Similarly, the voxelized models 720 and 740 are 3D scans of the entire object including the front (shown) and the sides and back of the object (not shown). As illustrated, the voxelized model 720 standing on a surface 722 depicted as 3D grid, to indicate depth to the voxelized model 720. Similarly, the voxelized model 740 standing on a surface 742 depicted as 3D grid, to indicate depth to the voxelized model 740.

As illustrated, the 3D scans 710 and 730 are of human objects wearing clothing in different body poses. By voxelizing the 3D scans 710 and 730, can reduce errors that are introduced during the rigging process due to the presence of clothing on the object, such as wrinkles in the clothing.

The processor 210 performs a voxelization on the 3D scans 710 and 730 (via the step 520 of FIGS. 5A and 5B). In certain embodiments, the processor 210 converts the 3D mesh to a simplified volumetric representation. For example, the processor 210 uses a voxel of a predefined grid size when generated the voxel representation of the 3D scans 710 and 730.

Figure 8B:
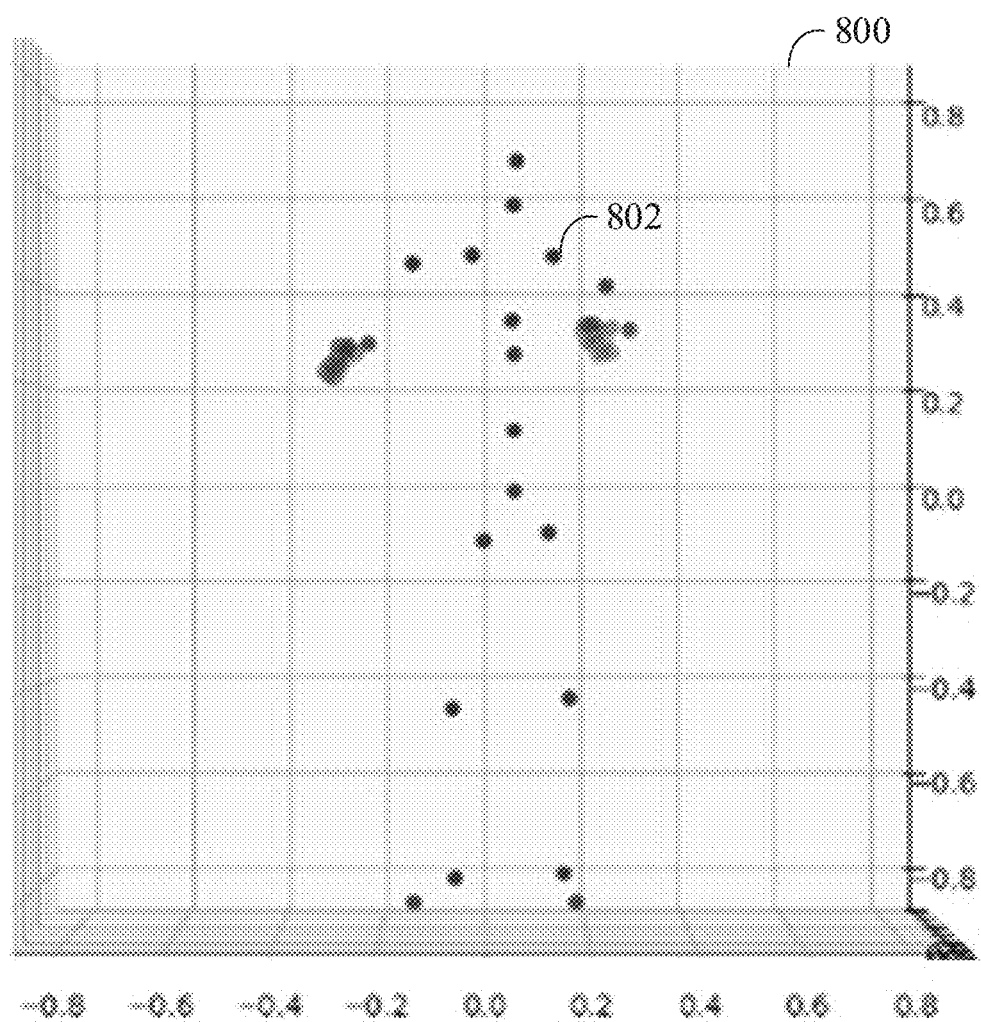
FIG. 8B illustrates a diagram that includes locations of joints of 3D scan as determined by the neural network of FIG. 8A in accordance with an embodiment of this disclosure

FIG. 8A illustrates an example architecture of a neural network for estimating a volumetric pose of a 3D scan in accordance with an embodiment of this disclosure. FIG. 8B illustrates a diagram 800 that includes locations of joints of 3D scan as determined by the neural network of FIG. 8A in accordance with an embodiment of this disclosure. The embodiments of FIGS. 8A and 8B are for illustration only and other embodiments can be used without departing from the scope of the present disclosure.

FIG. 8A illustrates an example neural network such as a volumetric based pose estimator 530a. The step 530 of FIGS. 5A and 5B can perform the process of the volumetric based pose estimator 530a and generate the heatmaps. For example, the 3D scan 710 undergoes the voxelization process of step 520 (of FIGS. 5A and 5B) to generate the voxelized model 720. The volumetric based pose estimator 530a generates the heatmap representing the identified joints (such as the joint 802) of the 3D scan 710. That is, volumetric based pose estimator 530a is a neural network that identifies locations of joints from the voxelized model 720.

To generate the heatmap, the processor 210 converts a scanned human mesh (such as the 3D scan 710) to the volumetric representation (illustrated as the voxelized model 720). The processor 210 can use any known technique to voxelize the 3D scan. For example, the processor 210 can use an open source CUDA voxelizer with a predefined target resolution, such as 128×128×128. This volumetric representation of human mesh is the input into the volumetric based pose estimator to estimate the joint coordinates. The volumetric based pose estimator is a neural network that can include 3D convolution, max pooling and deconvolution layers. The joint position is parameterized in the form of heatmap, allowing the processor 210 to extract the predicted joint position as the expectation of the coordinates.

It is noted that a heatmap is mathematical representation of the likelihood of a certain joint (such as the joint 802 of FIG. 8B) is placed at any voxel grid. Each joint has an heatmap for the prediction. FIG. 8B illustrates a diagram 800 that includes examples of predicted joints in the voxelization space. As illustrated, the multiple joints (such as the joint 802) are based on 3D scan model 710 and its corresponding voxilized model 720 of FIG. 7B. That is, the diagram 800 shows a 3D grid with multiple dots (such as the joint 802), with each dot representing a set of 3D coordinates (X, Y, Z) corresponding to a predicted joint of the 3D scan 710 of FIG. 7B.

As described in FIG. 9A, below, the predicted joint coordinates are mapped back to the mesh space and then provided to the Inverse Kinematic Net to estimate the parameters of the RPBM, which contains a kinematic tree layer to identify the bone direction and length based on the estimated joints.

For example, the volumetric based pose estimator 530a can be a 3D CNN. In certain embodiments the volumetric based pose estimator is similar to V2V-PoseNet. The volumetric based pose estimator 530a obtains the voxelized 3D mesh which represents the geometry of the object. FIG. 8A, illustrates one example implementation of the volumetric based pose estimator 530a. As illustrated, the volumetric based pose estimator 530a includes several residually connected 3D convolutional layers with one 3D pooling layer in between, followed by an encoder-decoder built by residual 3D CNN along with 3D max-pooling and deconvolutional up sampling layers. The output of which is then passed into one convolutional layer to predict the 3D heatmap for each joint. Other model architectures will also work.

As illustrated in FIG. 8A, the volumetric based pose estimator 530a includes 3×3×3 Conv, where N corresponds to the Convolutional layers with N channels and 3×3×3 kernel. Additionally, volumetric based pose estimator 530a includes 2×2×2 DeConv, where N, /2 corresponds to the N channel Deconvolutional layers with stride 2 and kernel size of 2×2×2. The residual 3D block (N) 532 can represent any of the residual layers of the volumetric based pose estimator 530a.

The heatmap represents each joint in 3D space. In certain embodiments, values within heatmap indicates the likelihood of the joint location at the corresponding position. In certain embodiments, the processor 210 computes a final predicted joint position as the coordinate expectation based on a regressed probability map (i.e. the heap map) via an integration operation.

In certain embodiments, the maximum value of the heatmap is selected as the predicated joint. In other embodiments, the joint positions identified based on a combination of a heatmap and location map. By combining the heatmap and the location map can reduce errors caused by quantization.

In certain embodiments, the volumetric based pose estimator 530a is trained by a mean square loss on both the regressed heatmap and joint coordinates expectation. For example, the volumetric based pose estimator 530a can be trained on a subset of two datasets such as an AMASS dataset and a DeepHuman Dataset. To increase convergence speed, the volumetric based pose estimator 530a could be first trained on the minimum clothed AMASS dataset and then fine-tuned on the mixture of the AMASS and the DeepHuman. If the one of the data sets, such as the DeepHuman dataset, does not provide ground truth annotations for the hand joints, the loss computations of the hand joints can be omitted. During the fine tuning, each batch can contain data from both datasets. In certain embodiments, two separate models could be trained, one corresponding to male subject and another corresponding to a female subject to accommodate variations of human body-skeleton relationships due to the gender differences. In certain embodiments, during the training process, cost function can be included to constrain the predicted joints within the body. For example, since the 3D scan is three dimensional, the cost function can ensure that the identified joints fall within the 3D scan and not on an external surface or external to the 3D scan.

Figure 9B:
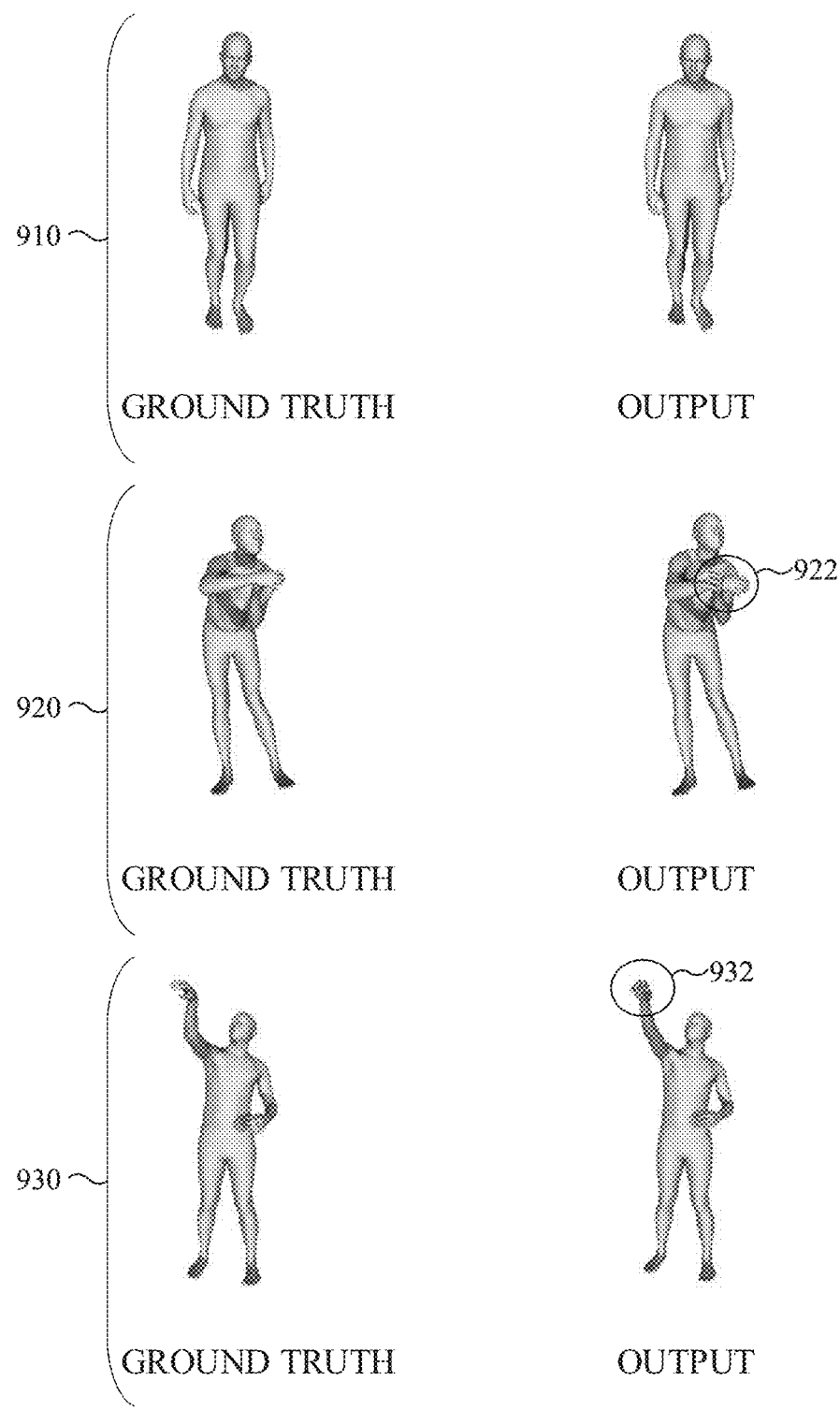
FIG. 9B illustrates diagrams comparing ground truth to a prediction of the neural network of FIG. 9A in accordance with an embodiment of this disclosure.

FIG. 9A illustrates an example architecture of a neural network for estimating parameters associated with the 3D scan in accordance with an embodiment of this disclosure. FIG. 9B illustrates diagrams comparing ground truth to a prediction of the neural network of FIG. 9A in accordance with an embodiment of this disclosure. The embodiments of FIGS. 9A and 9B are for illustration only and other embodiments can be used without departing from the scope of the present disclosure.

FIG. 9A illustrates an example neural network such as a parameter estimator 540a. The step 540 of FIGS. 5A and 5B can perform the process of the parameter estimator 540a. For example, the predicted joint coordinates (which are generated by the volumetric based pose estimator 530a) are mapped back to the mesh space and then provided to the parameter estimator 540a. The parameter estimator 540a then is used to estimate the parameters of the RPBM. The RPBM contains a kinematic tree layer to identify the bone direction and length based on the estimated joints. In certain embodiments, the parameter estimator 540a is a IK Net In certain embodiments, the parameter estimator 540a performs fast and coarse parametric body model fitting. The predicted joint coordinates from the volumetric based pose estimator 530a (of step 530) are first mapped back to the model space based on the bounding box coordinates and size before the voxelization of step 520. The parameter estimator 540a identifies the normalized bone direction and bone length based on the estimated joint position with the kinematic tree layer. Those statistics are then concatenated with the bone direction and bone length of the referenced pose (zero pose) to feed into the remaining fully connected layers. Based on the bone direction and bone length, the parameter estimator 540a can match a RPBM to the 3D scan.

The parameter estimator 540a can identifies parameters, such as pose parameters and shape parameters to alter the RPBM to correspond to the 3D scan. The pose parameters alter the pose of RPBM to correspond to the pose of the 3D scan. For example, the pose parameters can modify the RPBM which is in a generic pose, such as the pose illustrated in FIG. 6B to roughly match the pose of the 3D scan. The shape parameters modify the RPBM to match the body shape of the 3D scan. For example, body shape parameters specify the height, weight and overall body shape of the 3D scan. The body shape parameters can include a body and leg ratio, a waist size, a leg length, an arm length, and the like. These parameters can adjust the size and shape of the RPBM to correspond to the object (such as the human) of the 3D scan.

The example, parameter estimator 540a of FIG. 9A includes one fully connected layer with batch normalization and two residual modules each with two fully connected layers followed by batch normalization and ReLU non-linearity. All of the fully connected layers have 512 channels in this example implementation. As illustrated, the parameter estimator 540a, Linear, N corresponds to the fully connected layers with N channels.

In certain embodiments, the parameter estimator 540a is trained by minimizing the mean square loss to the ground truth RPBM parameters along with the geometric distance of the joints extracted from the reconstructed body generated with predicted RPBM parameters and ground truth RPBM parameters. The parameter estimator 540a can be trained on the entire AMASS dataset and the DeepHuman dataset. The parameter estimator 540a can be first trained on the minimum clothed AMASS dataset first and then fine-tuned on the mixture dataset along with the volumetric based pose estimator 530a. For instance, when training the parameter estimator 540a on the AMASS dataset, initially, the parameter estimator 540a can be first trained on noise free joint positions until convergence and then inject noise to the input joints coordinates. Additionally, a random shift for body joints can be manually added. For the hand joints, a random perturbation with slightly higher standard deviation can be applied to simulate the potentially inaccurate predicted joint coordinates provided by the pose estimation module. Similar to the training process of the volumetric based pose estimator 530a, two separate models could be trained, one corresponding to male subject and another corresponding to a female subject to accommodate variations of human body-skeleton relationships due to the gender differences.

In certain embodiments, the normalized bone direction and bone length are identified based on the predicted 3D joints. As such, the predicted 3D joints are not directly input into the parameter estimator 540a. Rather, the bone length and bone direction are calculated and attached to the reference bone length and bone direction (when the shape parameters and pose parameters are all zero) and provided as the input to the parameter estimator 540a.

FIG. 9B illustrates example diagrams (such as the diagram 910, 920, and 930) comparing the ground truth to the output of the parameter estimator 540a. As illustrated, the ground truth and the output of the diagrams 910 match. When the ground truth and the output match, indicates that the parameter estimator 540a identified that the parameters correctly. Alternatively, the ground truth and the output of the diagrams 920 and the diagrams 930 do not match. As illustrated, the error 922 of the diagrams 920 indicates an error of the parameter estimator 540a. Similarly, the error 932 of the diagrams 930 indicates an error of the parameter estimator 540a. Due to the presence of errors, the optimization step 550 of FIGS. 5A and 5B is performed. Errors of the parameter estimator 540a, such as the errors 922 and 932, can occur at the end of a limb structure such as in the hands or feet of a given pose. For example, the errors arise due to slight misalignment which can increases the further away the limb extends.

Figure 10A:
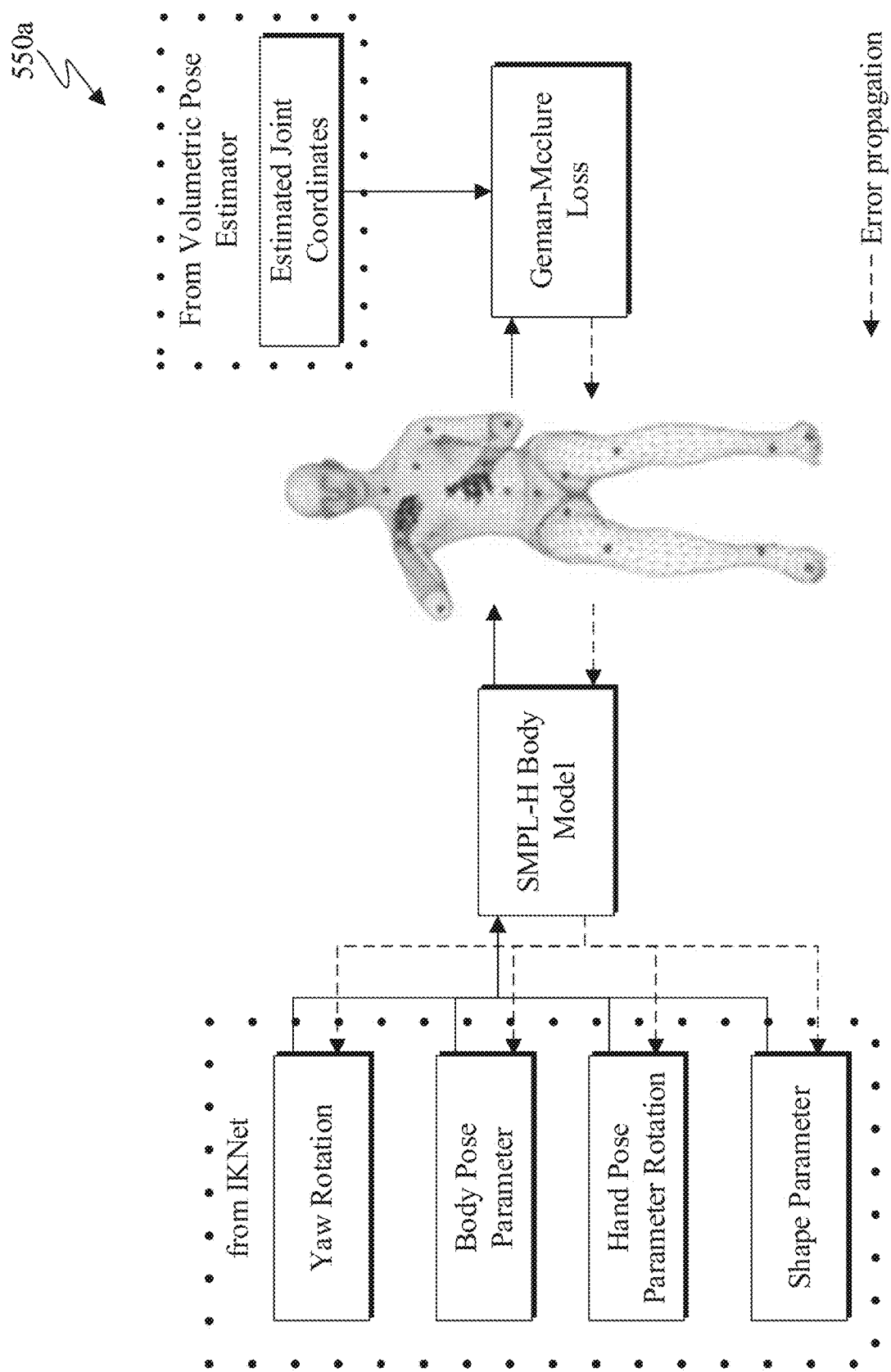
FIG. 10A illustrates an example diagram for modifying parameters in accordance with an embodiment of this disclosure.
Figure 10B:
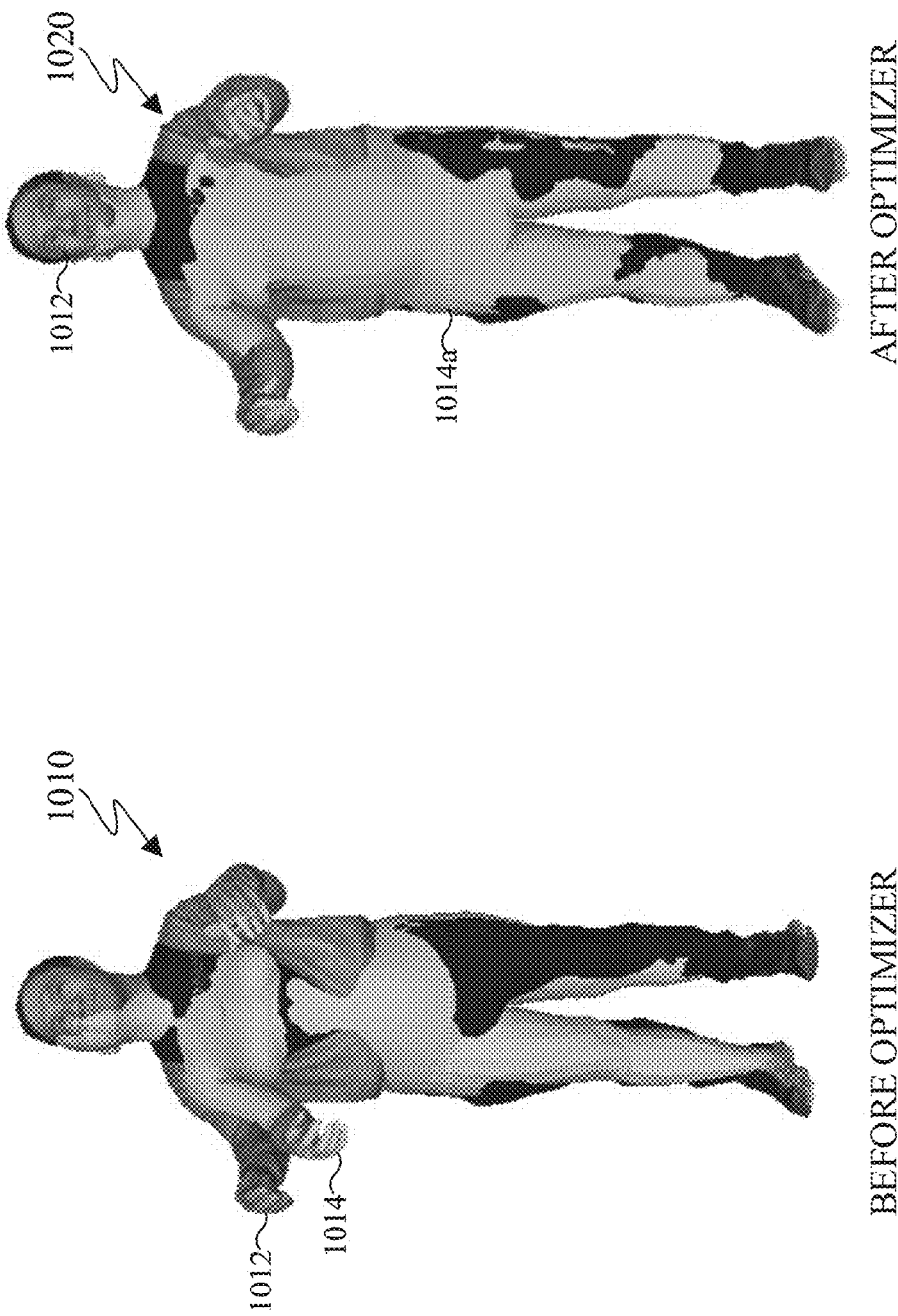
FIG. 10B illustrates before and after images of modifying the parameters as described in FIG. 10A in accordance with an embodiment of this disclosure.

FIG. 10A illustrates an example diagram for modifying parameters in accordance with an embodiment of this disclosure. FIG. 10B illustrates before and after images of modifying the parameters as described in FIG. 10A in accordance with an embodiment of this disclosure. The embodiments of FIGS. 10A and 10B are for illustration only and other embodiments can be used without departing from the scope of the present disclosure.

FIG. 10A illustrates an example optimization process 550a. The step 550 of FIGS. 5A and 5B can perform the process of the optimizer of step 550 of FIGS. 5A and 5B. For example, the predicted joint coordinates (which are generated by the volumetric based pose estimator 530a) are mapped back to the mesh space and then provided to the parameter estimator 540a to estimate the parameters of the RPBM (which includes the kinematic tree layer) and identify the bone direction and length based on the estimated joints. The estimated parametric body model parameters are then used as the initialization of the optimization process 550a, which fine tunes the predicted parameters by reducing the joint distance.

The optimization process 550a is an Inverse Kinematics post processing step for better fitting results. In certain embodiments, the yaw rotation, the body/hand pose parameters, the shape parameters, or a combination thereof are the parameters that are optimized. The RPBM takes the parameters and reconstructs the parametric body model. The energy function for optimization process 550a is the distance between the estimated joints and the joints from the reconstructed human model. To prevent the degradation brought by the inaccurately estimated joints, a Geman-Mcclure function is applied as a modulation to clamp the error caused by outlier joint prediction. For example, the optimization process 550a modifies the parameters identified by the parameter estimator 540a to reduce 3D joint errors between the 3D coordinates associated with the joints on the 3D scan and the 3D parametric body model. In certain embodiments, an Adam optimizer can be used in the optimization process 550a. In certain embodiments, the optimization process 550a is performed by a GPU.

FIG. 10B illustrates a diagram 1010 and a diagram 1020. The diagram 1010 shows a RPBM 1014 that is superimposed over the 3D scan 1012. For example, the diagram 1010 compares a 3D scan 1012 to a RPBM 1014 after the parameter estimator 540a is performed but before the optimization process 550a is performed. The 3D scan 1012 is similar to the 3D scan 710 of FIG. 7A and the RPBM 1014 can be similar to the RPBM 610 and 620 6A and 6B, but in a pose that closely matches the 3D scan 1012. In contrast, the diagram 1020 compares the 3D scan 1012 to the RPBM 1014a. The RPBM 1014a is modified by the optimization process 550a to better align with the 3D scan 1012. As illustrated the optimization process 550a modifies the joint by reducing errors as to joint locations between the 3D scan 1012 and a RPBM.

FIG. 11 illustrates an example architecture of a neural network for extracting features in accordance with an embodiment of this disclosure. The embodiment of FIG. 11 is for illustration only and other embodiments can be used without departing from the scope of the present disclosure.

FIG. 11 an example neural network such as a feature extractor 560a. The step 560 of FIG. 6B can perform the process of the feature extractor 560a. In certain embodiments the feature extractor 560a is extracts additional features from the voxel grid for the parameter estimator 540a. For example, the feature extractor 560a is a volumetric ResNet50 for extracting the additional features from the voxel grid for the parameter estimator 540a.

In certain embodiments, apart from the bone direction and bone length information from the estimated joint position and referenced joint coordinates, an additional feature vector of dimension 512 is provided as context information, which is computed with a 3D variation of the ResNet50 by replacing the 2D convolutional kernel to 3D. Other 3D CNN could also be used for this purpose. The context features are concatenated with the bone representations and input to the parameter estimator 540a. As illustrated the architecture of the feature extractor 560a includes 7×7×7 Conv, 64, /2 indicates convolutional layers with kernel size of 7×7×7, 64 channels and stride 2. It is noted that integer to the right of the multiple residual blocks indicates that the same architecture is repeated for N times. The residual 3D block (N) 562 can represent any of the residual layers of the feature extractor 560a.

Figure 12:
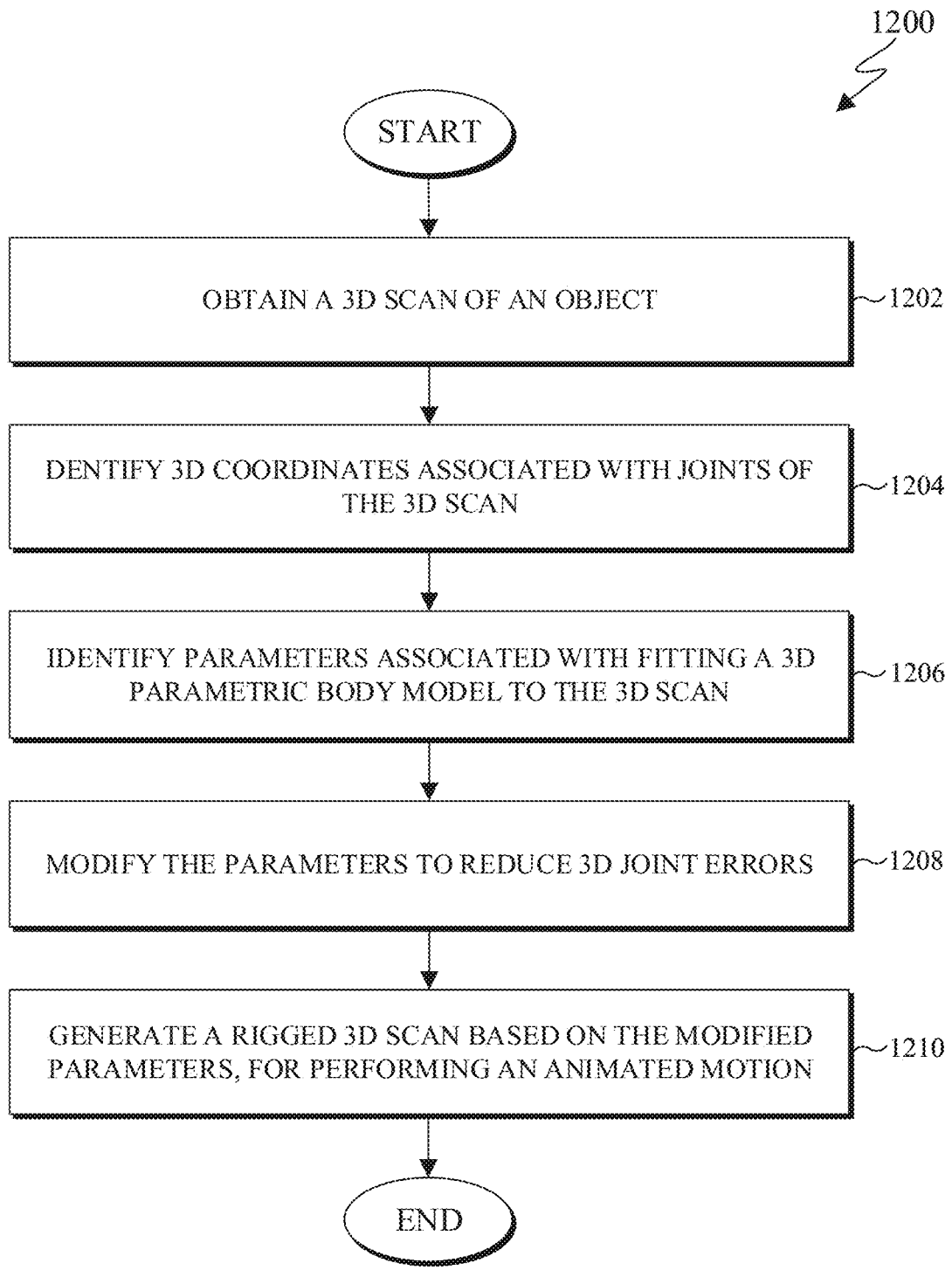
FIG. 12 illustrates example method for object rigging in accordance with an embodiment of this disclosure.

FIG. 12 illustrates example method for object rigging in accordance with an embodiment of this disclosure. The method 1200 can be performed by the server 104, one of the client devices 106-116 of FIG. 1, the server 200 of FIG. 2, the electronic device 300 of FIG. 3, or another suitable device. In certain embodiments, the method 1200 can be performed by a "cloud" of computers interconnected by one or more networks, where each is a computing system utilizing clustered computers and components to act as a single pool of seamless resources when accessed through the network 102 of FIG. 1. In certain embodiments, the steps of the method 1200 are performed by one or more neural networks. In some embodiments, a portion of the components that are used to process the method 1200 can be included in different devices, such as multiple servers 104 or 200, multiple client devices 106-116, or other combination of different devices. For ease of explanation the method 1200 is described as being performed by the server 104 of FIG. 1 with the internal components of the server 200 of FIG. 2. It is noted that any of the client devices 106-116 of FIG. 1 with the internal components of the electronic device 300 of FIG. 3 can be used to perform the method 1200 in addition to or in alternative of the server 104.

In step 1202, the server 200 receives a 3D scan of an object. In certain embodiments, the server 200 generates the 3D scan of the object. In other embodiments, the server 200 obtains the 3D scan from another device. The 3D scan can be a 3D mesh. After obtaining the 3D scan the server 200 can convert the 3D scan to a volumetric representation based on a 3D grid. The 3D grid can be a predefined size. In certain embodiments, each voxel of the grid is the same size. For example, a voxel could be a size of 128×128×128.

In step 1204, the server 200 identifies 3D coordinates associated with joints of the 3D scan. The server 200 can identify the location of the joints within the voxelized version of the 3D scan. In certain embodiments, the server 200 uses a neural network such as the volumetric based pose estimator 530a of FIG. 8A to identifies 3D coordinates associated with joints of the 3D scan. One of multiple neural networks can be selected to identify the location of the joints based on various aspects of the 3D scan. For example, if the 3D scan is of a human male, a first neural network (that is trained for identifying joints on a human male) is selected. For another example, if the 3D scan is of a human female, another neural network (that is trained for identifying joints on a human female) is selected. For yet example, if the 3D scan is of an animal such as a dog, another neural network (that is trained for identifying joints on a dog) is selected. In certain embodiments, the server 200 generates heatmaps. Additionally, a value associated with each element can include a probability associated with the location of the indicated joint.

In step 1206, the server 200 identifies parameters associated with fitting a 3D RPBM to the 3D scan based on the identified coordinates of the joints. To identify the parameters, the server maps the identified coordinates from the 3D scan (step 1204) to a 3D RPBM. To identify the parameters the server 200 can use a neural network such as the volumetric based pose estimator 530a of FIG. 8A. The neural network can identify a normalized bone direction between two of the joints in 3D space and a kinematic tree layer. Similarly, the neural network can identify a bone length connecting two of the joints in 3D space and a kinematic tree layer. After identifying the normalized bone direction and the bone length, the neural network can compare the normalized bone direction to a reference bone direction (based on the RPBM) and the bone length to a reference bone length (based on the RPBM). Once the RPBM is alighted to the identified joints of the 3D scan, the neural network can identify various parameters relating the RPBM to the 3D scan. For example, the parameters include a pose parameters, which relates the RPBM to the pose of the 3D scan. That is, the pose parameters alter the pose of RPBM to correspond to the pose of the 3D scan. For another example, the parameters can include shape parameters, which modifies the shape of the RPBM to correspond to the body shape of the 3D scan.

In step 1208, the server 200 modifies the parameters to reduce 3D joint errors between the 3D coordinates associated with the joint of the 3D scan and the RPBM. For example, the server 200 identifies the 3D joint errors as distances between the identified 3D coordinates of a joint of the 3D scan and the corresponding 3D coordinate of a joint of the RPBM. The server 200 then reduces the identified distances over multiple iterations and adjusts the pose and shape parameters to better align with the 3D scan.

In step 1210, the server 200 generates a rigged 3D scan based on the modified parameters. For example, the server 200 transfers attributes of the RPBM that corresponds to the shape and pose of the 3D scan (based on the modified parameters) to the 3D scan to generate the rigged 3D scan. To transfer the attributes of the RPBM to the 3D scan, the server 200 relates corresponding joints and skinning weights associated with identifiable parts of the rigged parametric model to the 3D scan. The attributes include the permitted motion, based on the type of joint. For example a knee joint and an elbow joint have limited motion in certain directions while a shoulder and hip joint provide motion in more directions. In certain embodiments, the server 200 adds animation motion to the rigged 3D scan. The rigged 3D scan can be animated and move based on a received input that provides instructions describing the movement.

Although FIG. 12 illustrates the method 1200, various changes can be made to FIG. 12. For example, while the FIG. 12 is shown as a series of steps, various steps could overlap, occur in parallel, or occur any number of times. FIG. 12 does not limit this disclosure to any particular system or apparatus.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device for object rigging, the electronic device comprising:
   a processor configured to:
      obtain a three-dimensional (3D) scan of an object;
      identify 3D coordinates associated with joints of the 3D scan;
      identify parameters associated with fitting a 3D parametric body model to the 3D scan based on the 3D coordinates of the joints, wherein, to identify the parameters, the processor is further configured to identify a bone length connecting two joints of the 3D parametric body model based on a distance between the two joints of the 3D scan and a kinematic tree layer;

modify the parameters to reduce 3D joint errors between the 3D coordinates associated with the joints on the 3D scan and the 3D parametric body model; and generate a rigged 3D scan based on the modified parameters, for performing an animated motion.

2. The electronic device of claim 1, wherein:
the processor is further configured to:
convert the 3D scan to a volumetric representation, based on a 3D grid of a predefined size, and
identify, from the converted 3D scan, the 3D coordinates associated with the joints; and
to identify the parameters, the processor is configured to map the 3D coordinates from the converted 3D scan onto the 3D parametric body model.

3. The electronic device of claim 1, wherein a neural network is used to identify the joints of the 3D scan.

4. The electronic device of claim 3, wherein the neural network includes a first neural network that is used when the 3D scan corresponds to a male and a second neural network that is used when the 3D scan corresponds to a female.

5. The electronic device of claim 1 wherein to identify the parameters, the processor is further configured to:
identify a normalized bone direction between the two joints based on a direction between the two joints and the kinematic tree layer.

6. The electronic device of claim 5 wherein the processor is further configured to:
compare the normalized bone direction to a reference bone direction; and
compare the bone length to a reference bone length.

7. The electronic device of claim 6, wherein the parameters include:
pose parameters corresponding to a pose of the 3D scan, and
shape parameters corresponding to a shape of the 3D scan, wherein the pose parameters and the shape parameters are based on the normalized bone direction, the bone length, the reference bone direction and the reference bone length.

8. The electronic device of claim 1, wherein to identify the joints, the processor is further configured to generate a 3D heatmap, a value associated with the 3D heatmap indicating a probability of a location of one joint.

9. The electronic device of claim 1, wherein to reduce the 3D joint errors, the processor is configured to:
identify the 3D joint errors as distances between the 3D coordinates associated with the joints and joint coordinates of the 3D parametric body model; and
reduce the distances over multiple iterations.

10. The electronic device of claim 1, wherein the 3D scan is a 3D mesh.

11. A method for object rigging, comprising:
obtaining a three-dimensional (3D) scan of an object;
identifying 3D coordinates associated with joints of the 3D scan;
identifying parameters associated with fitting a 3D parametric body model to the 3D scan based on the 3D coordinates of the joints, wherein identifying the parameters comprises identifying a bone length connecting two joints of the 3D parametric body model based on a distance between the two joints of the 3D scan and a kinematic tree layer;
modifying the parameters to reduce 3D joint errors between the 3D coordinates associated with the joints on the 3D scan and the 3D parametric body model; and
generating a rigged 3D scan based on the modified parameters, for performing an animated motion.

12. The method of claim 11, further comprising:
converting the 3D scan to a volumetric representation, based on a 3D grid of a predefined size, and
identifying, from the converted 3D scan, the 3D coordinates associated with the joints; and
wherein identifying the parameters, comprises mapping the 3D coordinates from the converted 3D scan onto the 3D parametric body model.

13. The method of claim 11, wherein a neural network is used to identify the joints of the 3D scan.

14. The method of claim 13, wherein the neural network includes a first neural network that is used when the 3D scan corresponds to a male and a second neural network that is used when the 3D scan corresponds to a female.

15. The method of claim 11 wherein identifying the parameters, comprises:
identifying a normalized bone direction between the two joints based on a direction between the two joints and the kinematic tree layer.

16. The method of claim 15 further comprising:
comparing the normalized bone direction to a reference bone direction; and
comparing the bone length to a reference bone length.

17. The method of claim 16, wherein the parameters include:
pose parameters corresponding to a pose of the 3D scan, and
shape parameters corresponding to a shape of the 3D scan, wherein the pose parameters and the shape parameters are based on the normalized bone direction, the bone length, the reference bone direction and the reference bone length.

18. The method of claim 11, wherein identifying the joints comprises generating a 3D heatmap, a value associated with the 3D heatmap indicating a probability of a location of one joint.

19. The method of claim 11, wherein reducing the 3D joint errors comprises:
identifying the 3D joint errors as distances between the 3D coordinates associated with the joints and joint coordinates of the 3D parametric body model; and
reducing the distances over multiple iterations.

20. The method of claim 11, wherein the 3D scan is a 3D mesh.

* * * * *